United States Patent
Han et al.

(10) Patent No.: US 11,190,915 B2
(45) Date of Patent: Nov. 30, 2021

(54) METHOD AND APPARATUS IN WHICH A PLURALITY OF ELECTRONIC DEVICES USE SERVICE LINKED TO ONE ELECTRONIC DEVICE

(71) Applicant: SAMSUNG ELECTRONICS CO., LTD., Suwon-si (KR)

(72) Inventors: Se-Hee Han, Seoul (KR); Jong-Hyo Lee, Yongin-si (KR); Joo-Yeol Lee, Seongnam-si (KR)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 738 days.

(21) Appl. No.: 15/998,719

(22) PCT Filed: Feb. 16, 2017

(86) PCT No.: PCT/KR2017/001738
§ 371 (c)(1),
(2) Date: Aug. 16, 2018

(87) PCT Pub. No.: WO2017/142336
PCT Pub. Date: Aug. 24, 2017

(65) Prior Publication Data
US 2021/0204102 A1    Jul. 1, 2021

(30) Foreign Application Priority Data
Feb. 16, 2016  (KR) .................. 10-2016-0017719

(51) Int. Cl.
*H04W 4/48*      (2018.01)
*H04W 76/15*     (2018.01)
(Continued)

(52) U.S. Cl.
CPC ................ *H04W 4/48* (2018.02); *G06F 3/14* (2013.01); *H04M 1/72409* (2021.01);
(Continued)

(58) Field of Classification Search
CPC ....... H04W 4/48; H04W 76/15; H04W 8/183; H04M 1/72409; G06F 3/14; G16Y 10/40; G16Y 10/65
See application file for complete search history.

(56) References Cited

U.S. PATENT DOCUMENTS

| 2007/0282905 A1 | 12/2007 | Karlberg |
| 2009/0042508 A1 | 2/2009 | Wakasa et al. |
| 2009/0097505 A1 | 4/2009 | Takahashi et al. |

(Continued)

FOREIGN PATENT DOCUMENTS

| CN | 101030434 A | 9/2007 |
| CN | 101409671 A | 4/2009 |

(Continued)

OTHER PUBLICATIONS

Communication dated Mar. 1, 2021, issued by the Japan Patent Office in counterpart Japanese Patent Application No. 2018-561464.

(Continued)

*Primary Examiner* — Ankur Jain
*Assistant Examiner* — Angelica M Perez
(74) *Attorney, Agent, or Firm* — Sughrue Mion, PLLC

(57) ABSTRACT

The present disclosure relates to a 5G or pre-5G communication system to be provided for supporting a higher data transmission rate than a 4G communication system such as LTE. An embodiment of the present disclosure relates to a method in which a plurality of devices use a service linked to a first device, the method comprising the steps of: performing a connection to a central display device, and mirroring the service to the central display device on the basis of a playlist of services stored in the first device; receiving, from a second device, a change request for the playlist, and updating the playlist to correspond to the change request; and transmitting information related to the updated playlist to the central display device.

18 Claims, 16 Drawing Sheets

(51) Int. Cl.
*H04M 1/72409* (2021.01)
*G06F 3/14* (2006.01)
*H04W 8/18* (2009.01)
*G16Y 10/40* (2020.01)
*G16Y 10/65* (2020.01)

(52) U.S. Cl.
CPC ........... *H04W 8/183* (2013.01); *H04W 76/15* (2018.02); *G16Y 10/40* (2020.01); *G16Y 10/65* (2020.01)

(56) References Cited

U.S. PATENT DOCUMENTS

| | | | | |
|---|---|---|---|---|
| 2011/0219105 | A1* | 9/2011 | Kryze | G06F 15/16 709/223 |
| 2012/0158212 | A1 | 6/2012 | Ying et al. | |
| 2015/0002369 | A1* | 1/2015 | Araki | G06F 3/1454 345/1.1 |
| 2015/0193904 | A1 | 7/2015 | Vermeulen | |
| 2015/0222680 | A1* | 8/2015 | Grover | H04L 65/4084 709/204 |

FOREIGN PATENT DOCUMENTS

| | | |
|---|---|---|
| CN | 101686631 A | 3/2010 |
| CN | 104574938 A | 4/2015 |
| EP | 2 838 020 A1 | 2/2015 |
| EP | 2980744 A1 | 2/2016 |
| JP | 2001-296875 A | 10/2001 |
| JP | 2006-252659 A | 9/2006 |
| JP | 2009-44410 A | 2/2009 |
| JP | 2009-540638 A | 11/2009 |
| JP | 2011-187058 A | 9/2011 |
| JP | 2015-012512 A | 1/2015 |

OTHER PUBLICATIONS

Communication dated Jul. 2, 2020 issued by the State Intellectual Property Office of P.R. China in counterpart Chinese Application No. 201780011833.X.

Communication dated Nov. 27, 2018, issued by the European Patent Office in counterpart European Application No. 17753497.1.

* cited by examiner

METHOD AND APPARATUS IN WHICH A PLURALITY OF ELECTRONIC DEVICES USE SERVICE LINKED TO ONE ELECTRONIC DEVICE

CROSS-REFERENCE TO RELATED APPLICATION(S)

This application is a National Phase Entry of PCT International Application No. PCT/KR2017/001738, which was filed on Feb. 16, 2017 and claims priority under 35 U.S.C. § 119 of Korean Patent Application No. 10-2016-0017719, filed on Feb. 2, 2016, in the Korean Intellectual Property Office the disclosure of which is incorporated herein by reference in its entirety.

BACKGROUND

1. Technical Field

The present disclosure relates to a technology in which a plurality of electronic devices use a service interlocking with one electronic device, and more particularly, to a method and apparatus for using a service interlocking with an electronic device connected with an in-vehicle infotainment (IVI) system.

2. Description of Related Art

Internet, which is a human-oriented connectivity network where humans generate and consume information, is now evolving to the Internet of Things (IoT) where distributed entities, such as things, exchange and process information. The Internet of Everything (IoE) has also emerged, which is a combination of the IoT technology and the Big Data processing technology through connection with a cloud server.

As technology elements, such as sensing technology, wired/wireless communication and network infrastructure, service interface technology, and security technology, have been demanded for IoT implementation, a sensor network, a Machine to Machine (M2M), Machine Type Communication (MTC), and so forth have been recently researched for connection between things.

Such an IoT environment may provide intelligent Internet technology (IT) services that create a new value to human life by collecting and analyzing data generated among connected things. IoT may be applied to a variety of fields including smart home, smart building, smart city, smart car or connected cars, smart grid, health care, smart appliances, advanced medical services, and so forth through convergence and combination between existing IT and various industries.

One of application examples of an IoT environment may include an in-vehicle infotainment (IVI) system. Through the IVI system, users enjoy various entertainments such as movies, real-time broadcasting, music, and so forth as well as a navigation function. In addition, with the popular use of smartphones, techniques using functions of the smartphones have been developed through the IVI systems. A representative example thereof may be a mirroring technique such as a mirror link, digital living network alliance (DLNA), and so forth. The IVI systems provide different platforms for different vehicle manufacturers, and thus some IVI system may support only some functions of a smartphone or may not support many functions. Accordingly, there is a need for an integrated scheme by which many users may use a service regardless of a platform of an IVI system.

SUMMARY

The present disclosure proposes a method and apparatus in which a plurality of electronic devices use a service interlocking with one electronic device.

The present disclosure also proposes a method and apparatus in which a service interlocking with an electronic device may be used in IVI.

Moreover, the present disclosure proposes a method and apparatus in which to use a service interlocking with an electronic device in an IVI device, a plurality of electronic devices configure common information for the service and uses the service on the basis of the configured common information.

According to an embodiment of the present disclosure, a method for controlling a service interlocking with a first device in an infotainment system includes setting up connection with the infotainment system and transmitting, to the infotainment system, mirroring data corresponding to a displaying screen of a playlist including items for a multimedia service used in the first device, setting up connection with a second device and receiving a change request for the playlist from the connected second device, updating the playlist to correspond to the change request, and transmitting mirroring data corresponding to a displaying screen of the updated playlist to the infotainment system.

According to another embodiment of the present disclosure, a first device for controlling a service interlocking with a first device in an infotainment system includes a transceiver configured to set up connection with the infotainment system, to transmit, to the infotainment system, mirroring data corresponding to a displaying screen of a playlist including items for a multimedia service used in the first device, to set up connection with a second device, and to receive a change request for the playlist from the connected second device, and a controller configured to update the playlist to correspond to the change request and to control the transceiver to transmit mirroring data corresponding to a displaying screen of the updated playlist to the infotainment system.

Other aspects, advantages, and key features of the present disclosure will be processed together with the attached drawings, and will be apparent to those of ordinary skill in the art from the following detailed description disclosing various embodiments of the present disclosure.

Before undertaking the detailed description below, it may be advantageous to set forth definitions of certain words and phrases used throughout this patent document: The terms "include" and "comprise," as well as derivatives thereof, mean inclusion without limitation; the term "or," is inclusive, meaning and/or; the phrases "associated with" and "associated therewith," as well as derivatives thereof, may mean to include, be included within, interconnect with, contain, be contained within, connect to or with, couple to or with, be communicable with, cooperate with, interleave, juxtapose, be proximate to, be bound to or with, have, have a property of, or the like. The term "controller" means any device, system or part thereof that controls at least one operation, and such a device may be implemented in hardware, firmware or software, or some combination of at least two of the same. It should be noted that the functionality associated with any particular controller may be centralized or distributed, whether locally or remotely. Definitions for certain words and phrases are provided throughout this patent document, those of ordinary skill in the art should understand that in many, if not most instances, such definitions apply to prior, as well as future uses of such defined words and phrases.

DETAILED DESCRIPTION

Figure 1A:
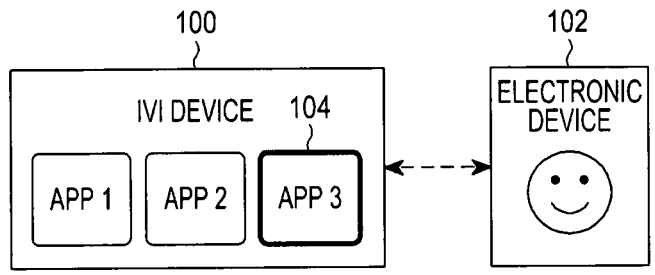
FIG. 1A illustrates an example of a first application interlocking scheme of a general in-vehicle infotainment (IVI) device.

Hereinafter, the operating principles of exemplary embodiments of the present disclosure will be described with reference to the accompanying drawings. Like components are referred to as like reference numerals even through being illustrated in different drawings, and in the following description, a detailed description of related well-known functions or configurations will not be provided if it unnecessarily obscures the subject matter of the present disclosure. The terms as used herein are defined considering the functions in the present disclosure and may be replaced with other terms according to the intention or practice of the user or operator. Therefore, the terms should be defined based on the overall disclosure.

Various changes may be made to the present disclosure and the present disclosure may have various embodiments which will be described in detail with reference to the drawings. However, the embodiments according to the concept of the present disclosure are not construed as limited to specified disclosures, and include all changes, equivalents, or substitutes that do not depart from the spirit and technical scope of the present disclosure.

It is to be understood that the singular forms "a," "an," and "the" include plural referents unless the context clearly dictates otherwise. Thus, for example, a component surface includes one or more component surfaces.

Although the terms such as "first" and "second" used in the various exemplary embodiments of the present disclosure may modify various elements of the various exemplary embodiments, these terms do not limit the corresponding elements. These terms may be used for the purpose of distinguishing one element from another element. For example, a first element may be named as a second element without departing from the right scope of the various exemplary embodiments of the present disclosure, and similarly, a second element may be named as a first element. The term "and/or" includes a combination of a plurality of related provided items or any one of the plurality of related provided items.

The terms used in the various exemplary embodiments of the present disclosure are for the purpose of describing particular exemplary embodiments only and are not intended to be limiting. The singular forms are intended to include the plural forms as well, unless the context clearly indicates otherwise. The term "include" or "has" used in the exemplary embodiments of the present disclosure is to indicate the presence of features, numbers, steps, operations, elements, parts, or a combination thereof described in the specifications, and does not preclude the presence or addition of one or more other features, numbers, steps, operations, elements, parts, or a combination thereof.

All of the terms used herein including technical or scientific terms have the same meanings as those generally understood by an ordinary skilled person in the related art unless they are defined other. The terms defined in a generally used dictionary should be interpreted as having the same meanings as the contextual meanings of the relevant technology and should not be interpreted as having ideal or exaggerated meanings unless they are clearly defined in the various exemplary embodiments. Hereinbelow, an electronic device according to an embodiment of the present disclosure may be a device which has mounted therein a platform capable of using an application program implemented in the form of an application and includes a communication function. For example, the electronic device may include at least one of a smartphone, a tablet personal computer (PC), a mobile phone, a video phone, an electronic book (e-book) reader, a desktop PC, a laptop PC, a netbook computer, a personal digital assistant (PDA), a portable multimedia player (PMP), an MP3 player, a mobile medical appliance, a camera, and a wearable device (e.g., a head-mounted-device (HMD) such as electronic glasses, electronic clothes, an electronic bracelet, an electronic necklace, an electronic appcessory, electronic tattoos, or a smart watch).

Generally, a scheme to interlock an in-vehicle infotainment (IVI) device with an application installed in a user's electronic device may be roughly classified into three types. FIG. 1A illustrates an example of a first application interlocking scheme of a general IVI device. Referring to FIG. 1A, an IVI device 100 uses an application (App 3) 104 that supports an integrated IVI platform provided by IVI manufacturers in cooperation. In this case, an electronic device 102 of a user may also install an application supporting the integrated IVI platform and use a service by interlocking with the IVI device 100. Thus, the user does not need to install or connect a separate program, a user interface (UI), or the like in or to the IVI device 100 to interlock the electronic device 102 with the IVI device 100. In this case, however, only an application supporting the integrated IVI platform may be used, and the IVI device 100 has to include a modem based on the integrated IVI platform.

Figure 1B:
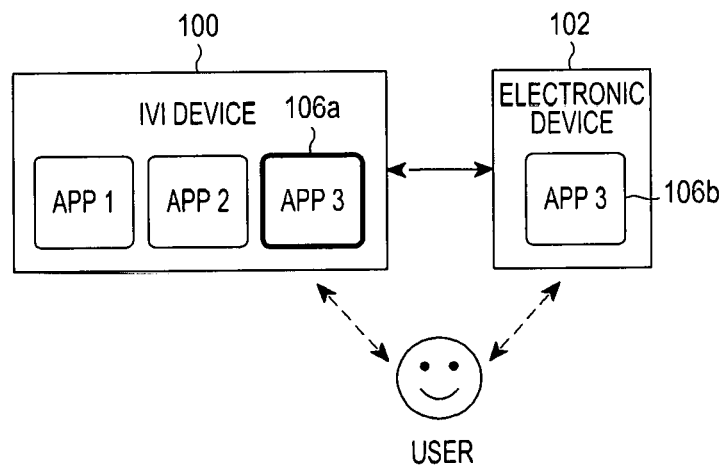
FIG. 1B illustrates an example of a second application interlocking scheme of a general IVI device.

FIG. 1B illustrates an example of a second application interlocking scheme of a general IVI device. Referring to FIG. 1B, the same applications 106a and 106b are installed in the IVI device 100 and the electronic device 102, respectively, and the applications 106a and 106b installed in the IVI device 100 and the electronic device 102, respectively, interlock with each other one to one (hereinafter, referred to as 1:1 app interlocking). In this case, the electronic device 102 may use a previously installed application, whereas vehicle manufacturers have to develop an IVI device application that may 1:1 interlock with the application installed in the electronic device or applications providing integrated contents that are available to both the electronic device and the IVI device.

Figure 1C:
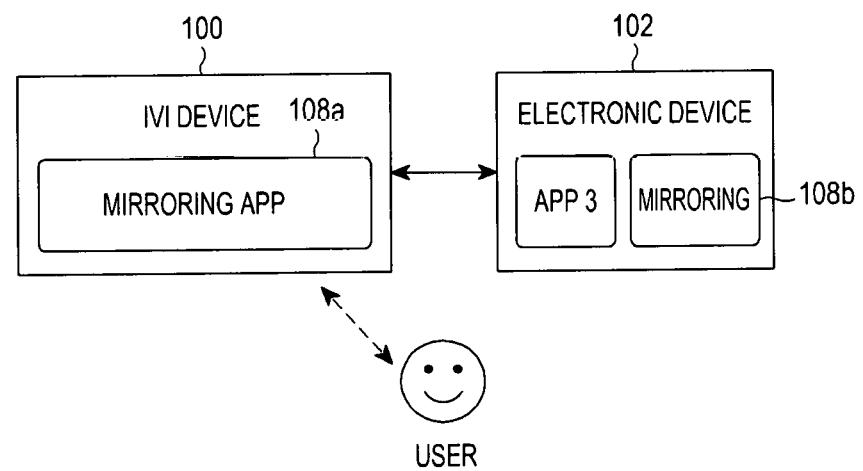
FIG. 1C illustrates an example of a third application interlocking scheme of a general IVI device

FIG. 1C illustrates an example of a third application interlocking scheme of a general IVI device. Referring to FIG. 1C, mirroring is used in which a screen of the electronic device 102 is displayed on the IVI device 100. In MirrorLink that is one of mirroring techniques, various applications installed in the electronic device 102 may be used through connection between the IVI device 100 and the electronic device 102, and operations of the electronic device 102 may be controlled through the IVI device 100. In another example, digital living network alliance (DLNA), devices in the same Internet Protocol (IP) band share contents through a network and reproduce media or copy the media to another device. In this case, as the IVI device 100 interlocks with a smartphone through an application (a mirroring app) 108a that supports MirrorLink, a vehicle manufacturer does not need to develop an application for separate IVI, whereas the electronic device 102 should compress a screen to be transmitted to the IVI device 100 in real time when executing the mirroring application 108a.

Figure 2:
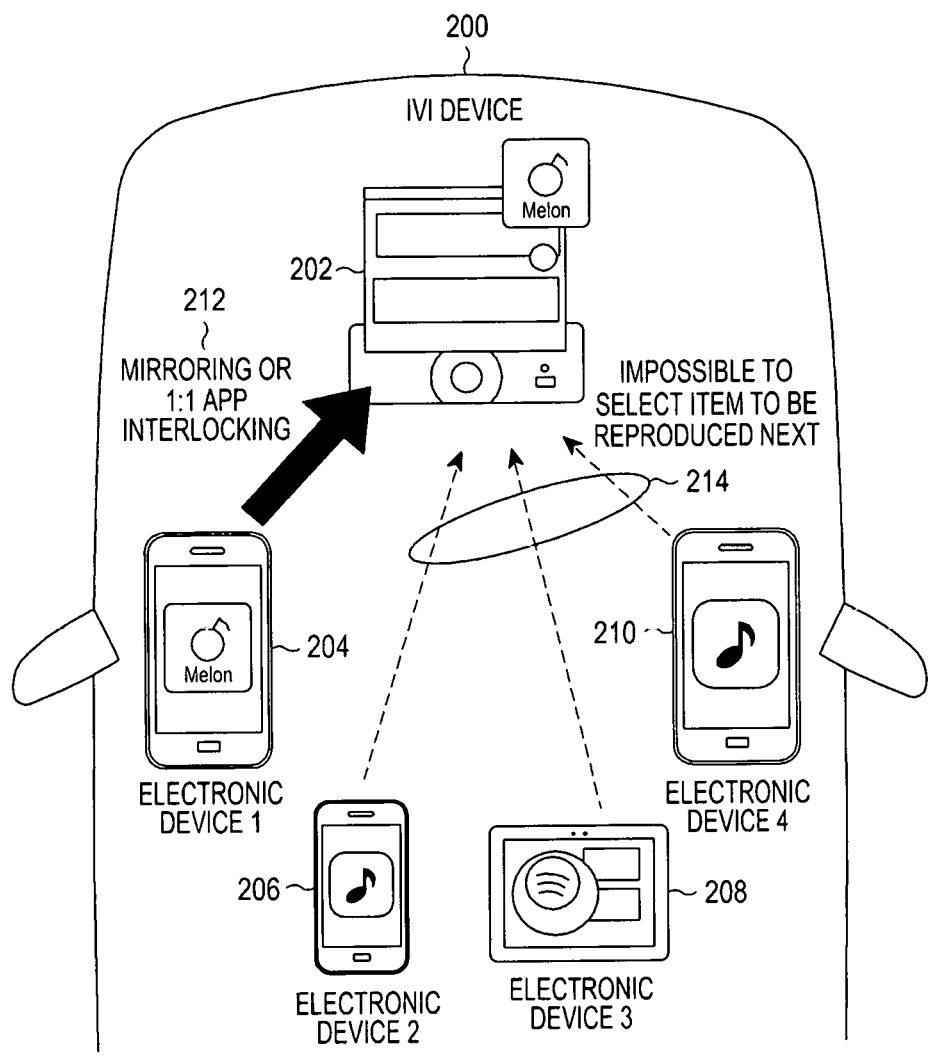
FIG. 2 illustrates an example of a problem that may occur when an electronic device is generally connected with an IVI device.

FIG. 2 illustrates an example of a problem that may occur when an electronic device is connected with an IVI device.

Referring to FIG. 2, for example, it is assumed that an IVI device 202 is installed in a vehicle 200 and there are four electronic devices 204 through 210 supporting a function for using a service by interlocking with the IVI device 202 in the vehicle 200. Herein, the four electronic devices 204 through 210 may be personal terminals of different users and some of them may be terminals of the same user.

In this case, it is assumed that when a user of the first electronic device 204 of a driver is connected with the IVI device 202 through mirroring or 1:1 app interlocking, the user is using an application installed in the first electronic device 204, for example, a media streaming service, through the IVI device 202. When the first electronic device 204 is connected with the IVI device 202, an electronic device that is not connected with the IVI device 202 (that is, one of the second electronic device 206 through the fourth electronic device 210) may not be able to perform manipulation of the IVI device 202 or control of the media streaming service as indicated by 214. For example, assuming that the media streaming service is a music streaming service, the second electronic device 206 through the fourth electronic device 210 may not be able to perform a control operation such as selecting a next song, stop a currently reproduced song, requesting reproduction of a previous song, and so forth. The second electronic device 206 through the fourth electronic device 210 may not be able to request addition of other items to items included in a media list provided in the first electronic device 204 and reproduction of those items. For such a control operation by one of the second electronic device 206 through the fourth electronic device 210, connection between the first electronic device 204 and the IVI device 200 has to be released and connection between a corresponding electronic device and the IVI device 200 has to be performed.

Therefore, the present disclosure proposes a scheme in which an electronic device in a vehicle may control services provided through an IVI device regardless of whether being connected with the IVI device. More specifically, an embodiment of the present disclosure proposes a scheme in which a plurality of users may control a service provided by an IVI device by interlocking with an electronic device. Thus, an embodiment of the present disclosure also proposes a scheme in which common information is configured for use of a service that is provided by an IVI device through interlocking with one electronic device, and an electronic device that is not connected with the IVI device may control the service by using the configured common information. In the embodiments shown in FIGS. 3A and 3B, for convenience, a description will be made of a case where another user not connected with an IVI device adds an item to a mirrored playlist, as a representative example of an operation of controlling a service provided by the IVI device through interlocking with one electronic device. However, an embodiment of the present disclosure is also applicable to other embodiments where a change by at least one another user not connected with the IVI device is reflected into the mirrored playlist. Herein, an example of the change may further include deletion of the selected items, setting of the number of reproduction times of the selected items, setting of a reproduction order of the mirrored playlist, and so forth, in addition to addition of the item.

Figure 3A:
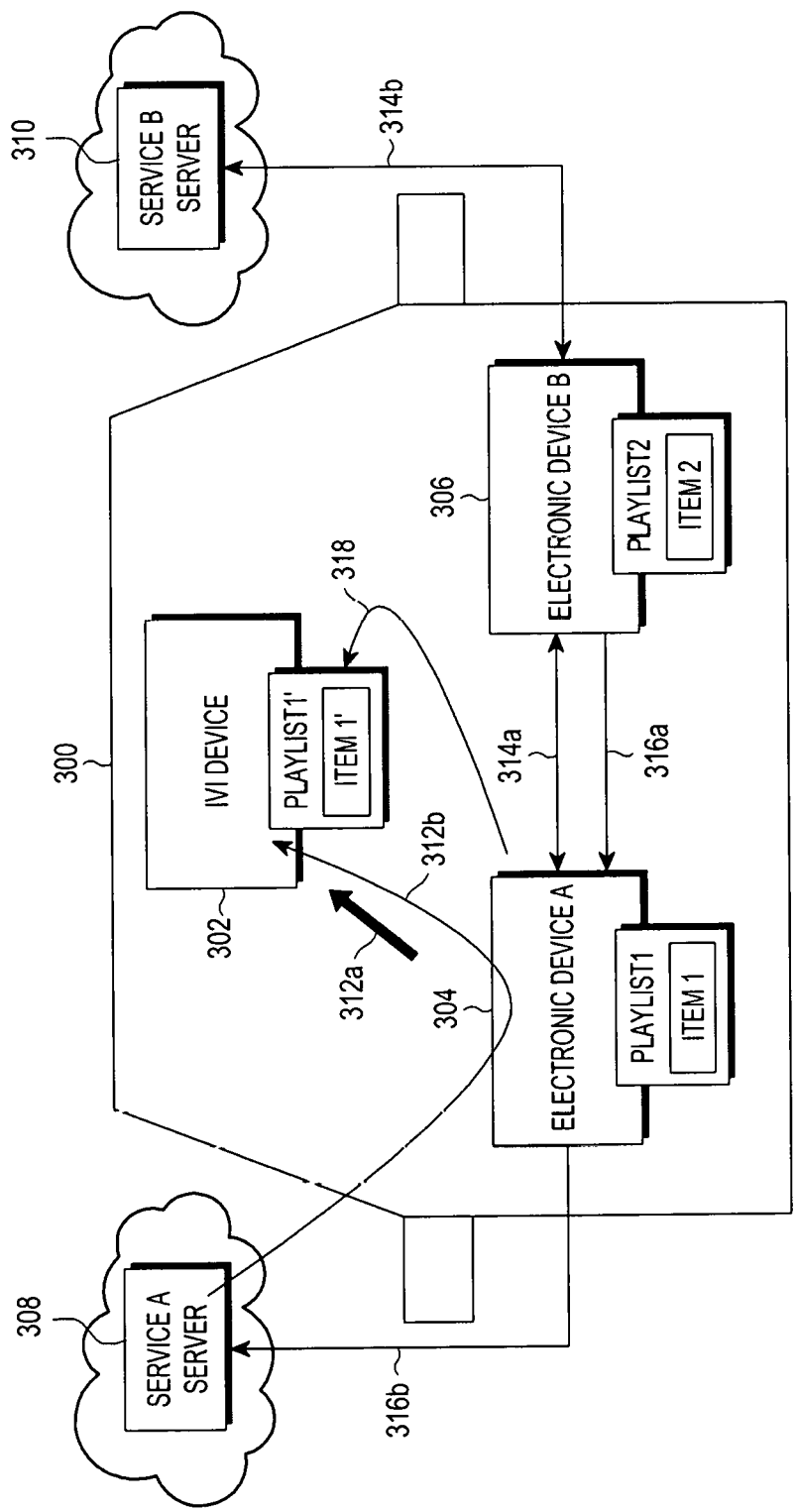
FIG. 3A is an example of a block diagram of an IVI system according to an embodiment of the present disclosure.

FIG. 3A is an example of a block diagram of an IVI system according to an embodiment of the present disclosure.

Referring to FIG. 3A, an IVI system according to an embodiment of the present disclosure may include an IVI device 302, and an electronic device A 304 and an electronic device B 306 supporting a function of interlocking with the IVI device 302, in which the IVI device 302, the electronic device A 304, and the electronic device B 306 are installed in a limited space, for example, in a vehicle 300. For convenience, it is assumed that the electronic device A 304 and the electronic device B 306 are terminals of different users and subscribe to services provided by different operators among services in the same field that are available through interlocking with the IVI device 302. Herein, the different operators may, for example, different platforms for the services. In the embodiment of FIG. 3A, it is assumed that a service A to which the electronic device A 304 subscribes and a service B to which the electronic device B 306 subscribes belong to the same field, for example, a media streaming service field, in which the service A is provided through a service A server 308 and the service B is provided through a service B server 310. Herein, the media streaming service to which the electronic devices subscribe is described as an example, and an embodiment of the present disclosure may be applied to not only a navigation or traffic guide service and an entertainment-related service, but also any service that may be provided through an IVI device. As a detailed example, it is assumed that when a driver uses the service A through the electronic device A 304, a playlist 1 including items to be reproduced is stored, and for example, an item 1 is included in the playlist 1.

Figure 3B:
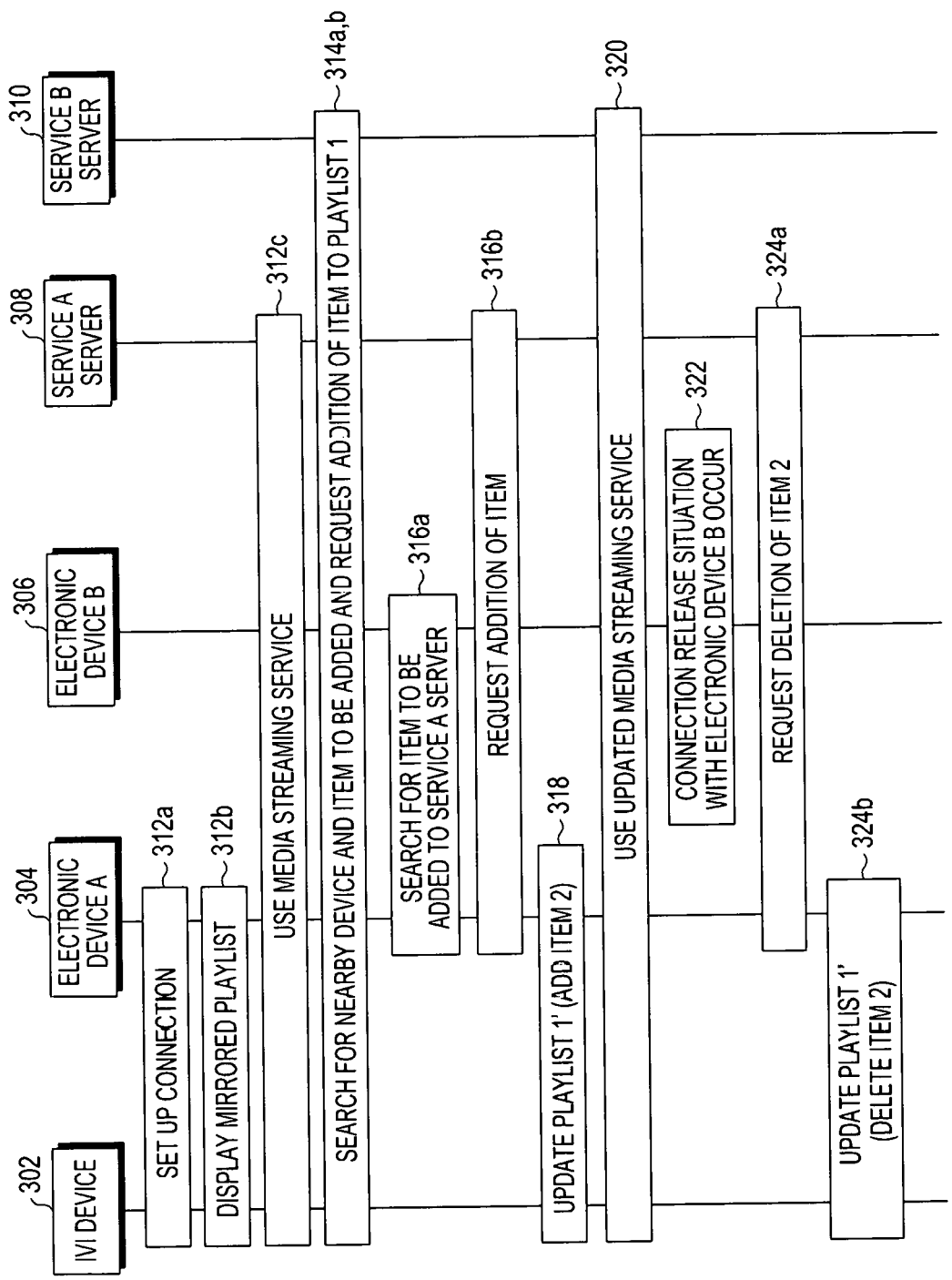
FIG. 3B illustrates an example of an operation flow in which an electronic device that is not connected with an IVI device adds an item to a playlist of the IVI device and uses the item in the IVI system of FIG. 3A.

FIG. 3B illustrates an example of an operation flow in which an electronic device that is not connected with an IVI device adds an item to a playlist of the IVI device and uses the item in the IVI system of FIG. 3A.

Referring to FIG. 3B, in operation 312a, the electronic device A 304 is connected with the IVI device 302 by performing a connection procedure. The connection procedure may be performed by using 1:1 app interlocking or activating the mirroring function. Although not shown, the electronic device A 304 is connected with the service A server 308 by executing a service A application supporting the service A, sends a request for the playlist 1 to the service A server 308, receives the playlist 1, and displays the playlist 1 on an execution screen of the service A application. Depending on an embodiment, the electronic device A 304 may select items to be reproduced from among items that may be provided by the service A server 308 through the service A application, on the basis of a previously selected condition, configure a new playlist with the selected items, and display the configured new playlist on the execution screen of the service A application. In operation 312b, the electronic device A 304 transmits mirroring data corresponding to the screen on which the playlist 1 is displayed to the IVI device 302. Thus, the displaying screen of a mirrored playlist 1' is displayed on the screen of the IVI device 302. For convenience, displaying of the mirrored playlist 1' by the IVI device 302 in operation 312b will be described in detail based on embodiments of FIG. 4.

Then, in operation 312c, the electronic device A 304 may use a media streaming service corresponding to the playlist 1 through the IVI device 302. Herein, the use of the media streaming service is performed based on control of items included in the playlist 1 input by the user through the IVI device 302 or the electronic device A 304. The control may include, for example, requesting sequential reproduction of the items, requesting repeated reproduction of a particular item, requesting reproduction with a skip of arbitrary items, requesting reproduction of an arbitrarily selected item, and so forth. The use of the media streaming service corresponding to the mirrored playlist 1' in operation 312c will be described in detail based on embodiments of FIG. 5.

At this time, it is assumed that another user in the vehicle 300 desires to play an item 2 that is not included in the playlist 1 through the user's electronic device B 306. In this case, according to an embodiment, the electronic device B 306 searches for a nearby device and a service to search for the electronic device A 304 connected with the IVI device 302 in operations 314a and 314b. Once the electronic device A 304 is searched, the electronic device B 306 performs the connection procedure with the electronic device A 304. Herein, the search for the nearby device and the service by the electronic device that is not connected with the IVI device will be described in detail based on embodiments of FIG. 6. Once the electronic device A 304 and the electronic device B 306 are connected with each other, the electronic device B 306 sends a request for metadata of the item 2 to be added to the playlist 1' to the service B server 310 to which the electronic device B 306 subscribes, and obtains the metadata from the service B server 310 according to an embodiment of the present disclosure. Herein, the metadata may include a song title, a singer name, and lyrics, and so forth of the item 2. When the metadata of the item 2 is obtained, the electronic device B 306 sends a request for adding a new item to the playlist 1' to the electronic device A 304 in operation 316a. At this time, the metadata of the new item, that is, the item 2 is delivered through the request. The electronic device A 304 having received the addition request accesses the service A server 308 through the service A application and searches for the item 2 based on the metadata of the item 2 in operation 316b. Herein, the addition of the items by the electronic device A 304 to the mirrored playlist 1' requested from another user will be described in detail based on embodiments of FIG. 7. When the service A server 308 does not provide the item 2 as a result of the search, the electronic device A 304 notifies the electronic device B 306 that the item 2 may not be provided.

When the item 2 is searched as a result of the search, the electronic device A 304 updates the playlist 1' of the IVI device 302 by adding the searched item 2 to the playlist 1' in operation 318. The electronic device A 304 mirrors mirroring data corresponding to a displaying screen of a playlist 1" having the item 2 added thereto onto the IVI device 302. Thus, the IVI device 302 displays the screen on which the playlist 1" having the item 2 added thereto is displayed. The added item 2 may be marked with a flag indicating a temporarily reproduced item according to an embodiment of the present disclosure, thereby allowing the user of the electronic device B 306 to easily delete the item 2 from the playlist 1' when getting off the vehicle 300 or at a time desired by the electronic device A 304. The flag may include identification information of a user or electronic device having added the item, or a predetermined indicator. Herein, for convenience, a description has been made of a case where the number of items another user desires to add is 1, but the description is also applicable to a case where the number of items to be added is greater than or equal to 2. Thus, when two or more items are added to the playlist 1' mirrored onto the IVI device 302, each of the two or more items may be mapped to identification information of a user or electronic device having added the item thereto or a predetermined indicator and may be displayed on the displaying screen of the IVI device 302.

In operation 320, the electronic device B 306 may use a media streaming service corresponding to the playlist 1' having the item 2 added thereto through the IVI device 302. Like in operation 312c, the use of the media streaming service corresponding to the playlist 1' having the item 2 added thereto is performed based on control of the items included in the playlist 1' input by the user through the IVI device 302 or the electronic device A 304. Herein, a description of the control overlaps the description of operation 312c, and thus will not be provided. Details of operation 320 will be described in more detail based on embodiments of FIG. 8.

In operation 322, it is assumed that a connection release situation between the electronic device A 304 and the electronic device B 306 occurs. More specifically, it may be assumed that the user of the electronic device B 306 gets off the vehicle 300. Depending on an embodiment, it may also be assumed that the driver or another user determines to stop playing the item 2. In this case, the electronic device A 304 sends a deletion request for deleting the item 2 to the service A server 308 in operation 324a and updates the playlist 1' mirrored onto the IVI device 302 by deleting the item 2 from the playlist 1' in operation 324b. The deletion of the item added by another user to the mirrored playlist 1' will be described in more detail according to embodiments of FIG. 9. The electronic device A 304 transmits mirroring data corresponding to a displaying screen of the playlist 1" having the item 2 deleted therefrom to the IVI device 302. Thus, the IVI device 302 displays the screen on which the playlist 1" having the item 2 deleted therefrom is displayed. Then, the users in the vehicle 300 may use a media streaming service corresponding to the playlist 1" having the item 2 deleted therefrom through the IVI device 302.

Hereinafter, with reference to FIGS. 4 through 9, a detailed description will be made of embodiments of operations where an electronic device that is not connected with an IVI device adds an item to a playlist of the IVI device and uses the added item according to the embodiments of FIGS. 3A and 3B. Thus, FIGS. 4 through 9 will be described based on the operations in the IVI system of FIGS. 3A and 3B.

Figure 4:
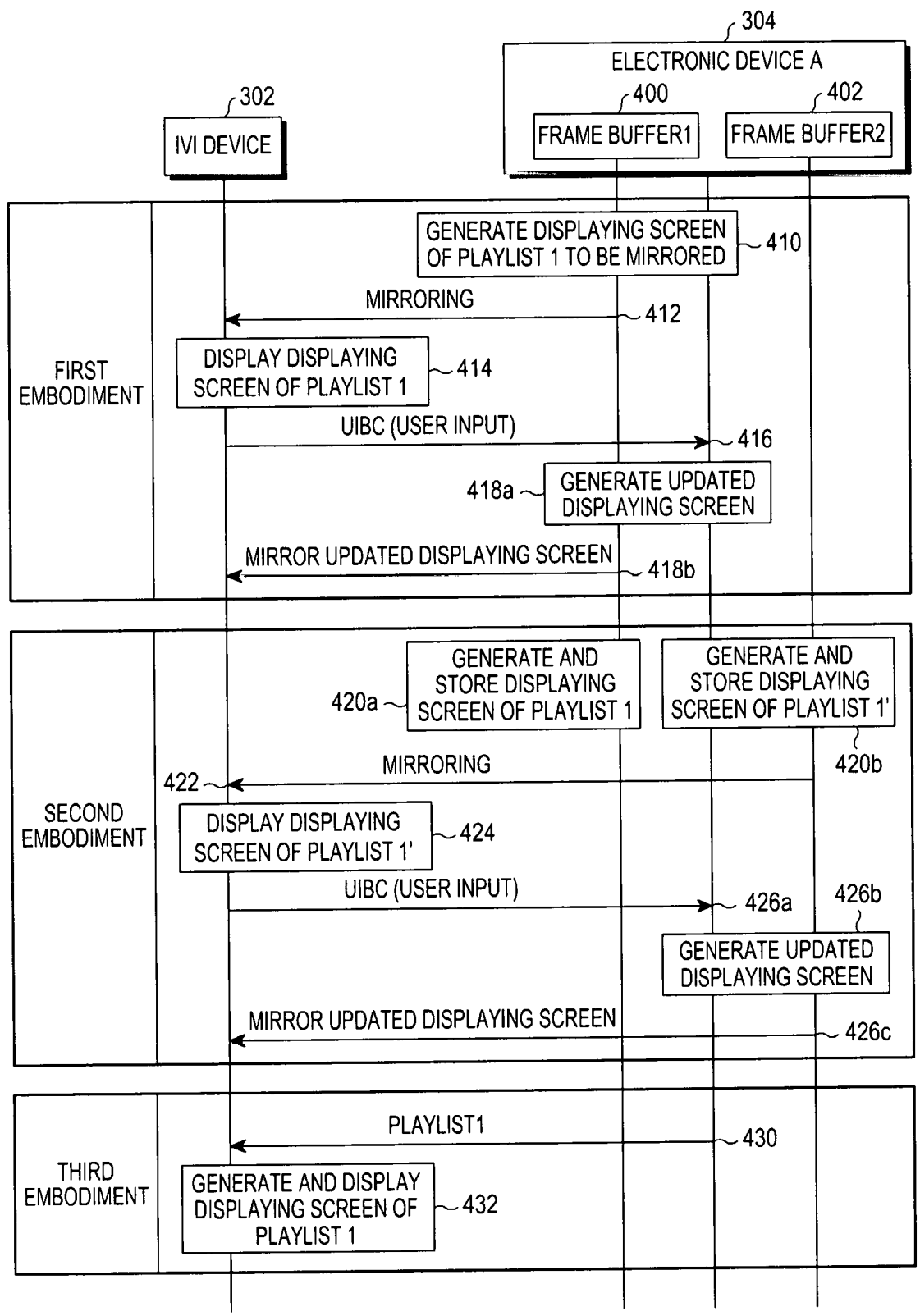
FIG. 4 shows an operation flow of embodiments in which an IVI device displays a music playlist mirrored from an electronic device according to an embodiment of the present disclosure.

FIG. 4 shows an operation flow of examples in which an IVI device displays a music playlist mirrored from an electronic device according to an embodiment of the present disclosure. According to an embodiment of the present disclosure, the electronic device A 304 may include a frame buffer 1 400 that stores a playlist 1 of a service A provided from the service A server 308 and a separate frame buffer 2 402 for storing a playlist including items added to the playlist 1 at the request of another user (hereinafter, referred to as a temporary playlist).

Referring to FIG. 4, in a first embodiment, in operation 410, the electronic device A 304 generates the displaying screen of the playlist 1 to be mirrored onto the IVI device 302 and stores the generated displaying screen in the frame buffer 1 400. In operation 412, the electronic device A 304 transmits the displaying screen of the playlist 1 and data corresponding to audio provided together with the displaying screen of the playlist 1 on the electronic device A 304 to the IVI device 302. The displaying screen of the playlist 1 may include raw pixel data or compressed data. The IVI device 302 having received the displaying screen and the data displays the displaying screen of the playlist 1 and outputs the audio in operation 414.

In operation 416, once sensing a user input, the IVI device 302 delivers the user input sensed through a user interface back channel (UIBC) to the electronic device A 304. The user input is a control operation with respect to the playlist 1 and overlaps the control of the items included in the playlist 1 in operation 312c, and thus will not be described repeatedly. In operation 418a, the electronic device A 304 generates a displaying screen updated corresponding to the user input and stores the generated displaying screen in the frame buffer 1 400. For example, when receiving a request for reproducing the item 1, the electronic device A 304 may generate a reproducing screen of the item 1 as the updated displaying screen. In operation 418b, the electronic device A 304 transmits the updated displaying screen and data corresponding to audio provided together with the reproducing screen of the item 1 on the electronic device A 304 to the IVI device 302. Thus, the IVI device 302 displays the updated displaying screen and outputs the audio. In the first embodiment of the present disclosure, as the playlist of the electronic device A 304 and the playlist including items added at the request of another user are stored in the same frame buffer, the user of the electronic device A 304 may experience inconvenience in using the existing playlist later. For example, when many items are added from another user that is not connected with the IVI device according to the scheme described in FIG. 3B, the user of the electronic device A 304 may have to search for the existing stored item from the correspondingly updated playlist or delete the added items from the updated playlist to use only the existing stored items.

Thus, in a second embodiment of the present disclosure, to separately store a playlist stored in an electronic device and a mirrored playlist, the separate frame buffer 2 402 for storing a playlist to be mirrored onto the IVI device is used and the mirrored playlist or the playlist updated by change by another user is stored through the separate frame buffer 2 402. More specifically, in operation 420a, once the electronic device A 304 configures or generates the playlist 1 used therein, the electronic device A 304 stores the configured or generated playlist 1 in the frame buffer 1 400. In operation 420b, the electronic device A 304 stores the playlist 1" that is a copy of the playlist 1 for mirroring the playlist 1' onto the IVI device 302 in the frame buffer 2 402. Thereafter, when the playlist 1" that is updated by reflecting changes to the playlist 1' mirrored onto the IVI device 302 by another electronic device is generated or configured, the generated or configured playlist 1' is stored in the frame buffer 2 402, thereby independently managing the existing playlist 1 stored in the electronic device A 400 and the playlist 1' used through the IVI device 302. In operation 422, the electronic device A 400 transmits the displaying screen of the playlist 1' stored in the frame buffer 2 402 and data corresponding to audio provided together with the displaying screen of the playlist 1 on the electronic device A 304 to the IVI device 302. In operation 422, like in operation 412, the displaying screen of the playlist 1' may include raw pixel data or compressed data. Thus, in operation 424, the IVI device 302 displays the playlist 1' on the displaying screen and reproduces the audio in correspondence to a user input.

In operation 426a, once sensing the user input, the IVI device 302 delivers the user input sensed through a UIBC to the electronic device A 304. Herein, the user input is a control operation with respect to the playlist 1, and overlaps the description of operation 312c, and thus will not be described repeatedly. According to the second embodiment of the present disclosure, in operation 426b, the electronic device A 304 generates a displaying screen corresponding to the user input and stores the generated displaying screen in the frame buffer 2 402. In operation 426c, the electronic device A 304 transmits the displaying screen updated corresponding to the user input and mirroring data corresponding to audio provided together with the displaying screen corresponding to the user input. After storing the displaying screen of the playlist 1' updated to include items added by another user in the frame buffer 2 402, the electronic device A 304 transmits the displaying screen corresponding to the user input and the mirroring data corresponding to the audio to the IVI device 302.

In a third embodiment, 1:1 app interlocking is used. In this case, it is assumed that the IVI device 302 supports an application that may 1:1 interlock with a service A application installed in the electronic device A 304. For example, in operation 430, the electronic device A 304 delivers its playlist 1 to the IVI device 302 through the installed service A application. Then, in operation 432, the IVI device 302 generates and displays the displaying screen of the playlist 1' through an application interlocking with the service A application.

According to another embodiment of the present disclosure, the user of the electronic device A 304 may reconfigure the playlist 1 by reflecting changes of the playlist 1' of the IVI device 302 updated at the request of another user into the playlist 1 stored in the frame buffer 1 400. The reconfigured playlist 1 is stored in the frame buffer 1 400, and when a corresponding displaying screen is mirrored, the playlist 1" corresponding to the reconfigured playlist 1 is stored in the frame buffer 2 402. For example, added items may be added to the playlist 1 or deleted items may be deleted from the playlist 1. Thereafter, the electronic device A 304 may use a media streaming service by interlocking with the electronic device A 304 or the IVI device 302 through the reconfigured playlist 1.

Figure 5:
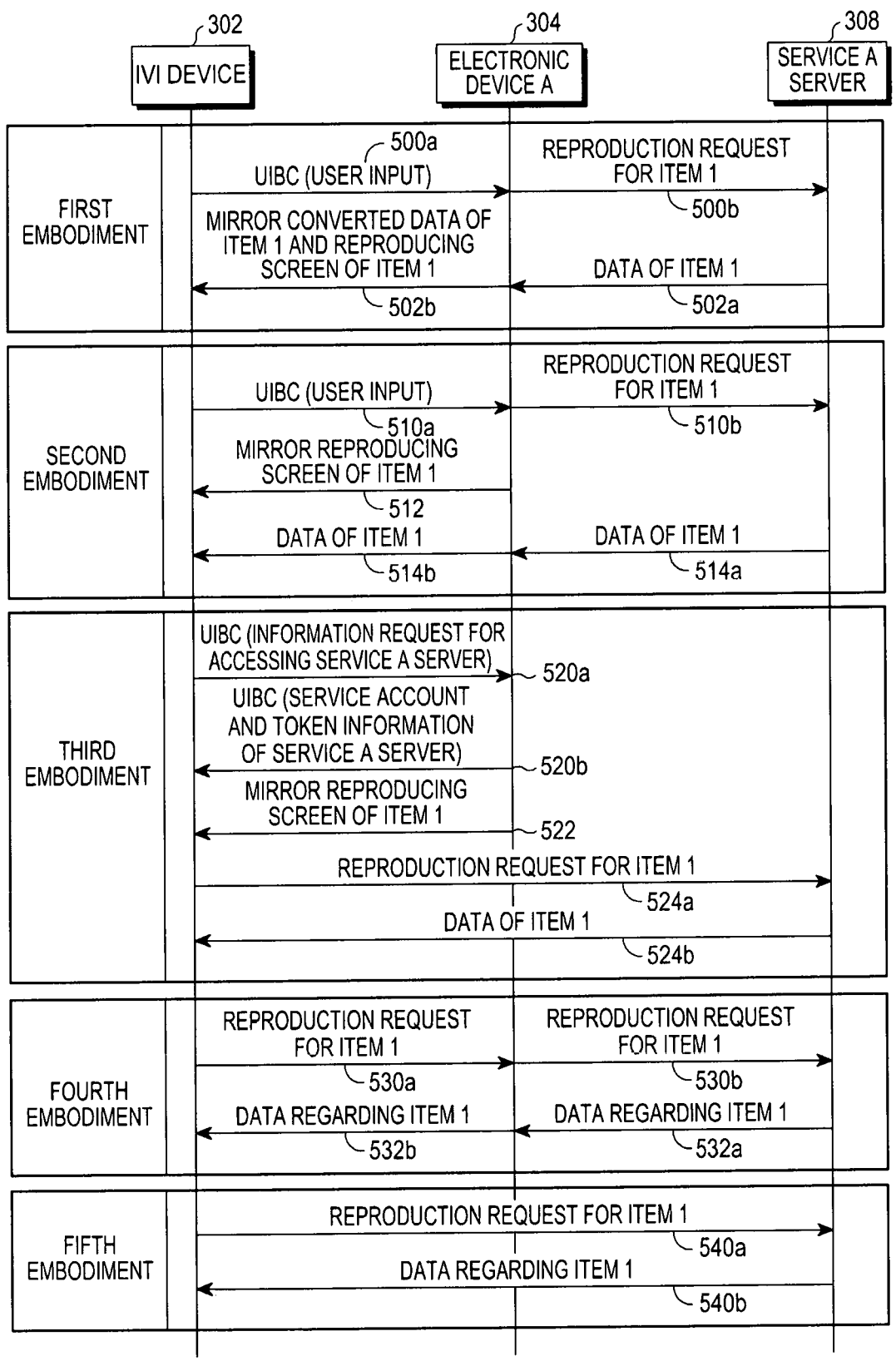
FIG. 5 shows an operation flow of embodiments in which a music playlist mirrored from an electronic device is used through an IVI device according to an embodiment of the present disclosure.

FIG. 5 shows an operation flow of embodiments in which a music playlist mirrored from an electronic device is used through an IVI device according to an embodiment of the present disclosure.

Referring to FIG. 5, in a first embodiment, in operation 500a, the user input sensed by the IVI device 302 is delivered to the electronic device A 304 through the UIBC. Herein, the user input is assumed to be a request for reproducing one of items included in the playlist 1 of the electronic device A 304 displayed by the electronic device A 304 using mirroring or 1:1 interlocking through the IVI device 302, for example, an item 1. In operation 500b, the electronic device A 304 delivers a play request including an identifier of the play-requested item 1 to the service A server 308. Once receiving data of the item 1 streamed from the service A server 308 in operation 502a, the electronic device A 304 converts the data to output the data in the form of voice or an image through the application supported by the service A in operation 502b. The electronic device A 304 generates a displaying screen on which the item 1 is reproduced and data corresponding to audio provided together with the displaying screen on which the item 1 is reproduced on the electronic device A 304, and mirrors the converted data of the item 1, the displaying screen, and the data corresponding to the audio to the IVI device 302. In this case, re-encoding for delivering the data to the IVI device 302 is performed and transmitted to the IVI device 302 through a channel for the mirroring.

In the second embodiment, it is assumed that the WI device 302 supports coding of the converted data to be output in the form of voice or an image. Coding by the IVI device 302 may be obtained during connection with the electronic device A 304. In a detailed example, operations 510a, 510b, and 512 are identical to operations 500a, 500b, and 502. Once receiving the data corresponding to the item 1 from the service A server 308 in operation 514a, the electronic device A 304 transmits the displaying screen on which the item 1 is reproduced and the audio provided together with the displaying screen to the IVI device 302 in operation 512. The electronic device A 304 does not convert the item 1 to output the item 1 in the form of voice or an image in operation 514a and transmits the data regarding the item 1 to the IVI device 302 through a channel that is separate from a mirroring channel in operation 514b. The IVI device 302 converts the data corresponding to the item 1 and reproduces the converted data.

In a third embodiment, it is assumed that the IVI device 302 senses a user input for directly requesting control of the mirrored playlist 1 from the service A server 308. More specifically, it is assumed that the IVI device 302 senses a user input corresponding to an information request for accessing the service A server 308. In operation 520a, the IVI device 302 delivers the information request for accessing the service A server 308 to the electronic device A 304 through the UIBC. The electronic device A 304 delivers a service account and token information of the service A server 308 to the IVI device 302 through the UIBC in operation 520b and transmits the displaying screen on which the item 1 is reproduced and audio provided together with the displaying screen to the IVI device 302 in operation 522. When the IVI device 302 is directly connectible with the Internet, the IVI device 302 inputs the reproduction request for reproducing the item 1 by accessing the service A server 308 by using the service account and the token information of the service A server 308 delivered through the electronic device A 304 in operation 524a. In operation 524b, the IVI device 302 receives and reproduces the data of the item 1 streamed from the service A server 308. When the IVI device 302 is not directly connectible with the Internet, the IVI device 302 delivers the reproduction request for reproducing the item 1 to the service A server 308 through the electronic device A 304 by tethering to the electronic device A 304 and receives the data of the item 1 streamed from the service A server 308 through the electronic device A 304.

A fourth embodiment and a fifth embodiment correspond to a case where the IVI device 302 uses 1:1 app interlocking. In the fourth embodiment, it is assumed that the IVI device 302 supports an application interlocking with a service A application installed in the electronic device A 304. In operation 530a, the IVI device 302 delivers the reproduction request for reproducing the item 1 to the electronic device A 304 by using the application interlocking with the service A application. In operation 530b, the electronic device A 304 accesses the service A server 308 through the service A application and delivers the reproduction request for reproducing the item 1. In operations 532a and 532b, the data regarding the item 1 streamed from the service A server 308 is received and delivered to an application of the IVI device 302.

In the fifth embodiment, when the IVI device 302 is connectible to the Internet and thus may install therein the service A application provided by the service A server 308, the IVI device 302 may directly transmit the reproduction request for reproducing the item 1 through the service A application in operation 540a. In this context, in operation 540b, the data regarding the item 1 streamed from the service A server 308 is directly delivered to the IVI device 302 and reproduced. Thereafter, in the fourth and fifth embodiments, the IVI device 302 having received the data of the item 1 drives the service A application to convert the item 1 into voice or an image for reproduction.

Figure 6:
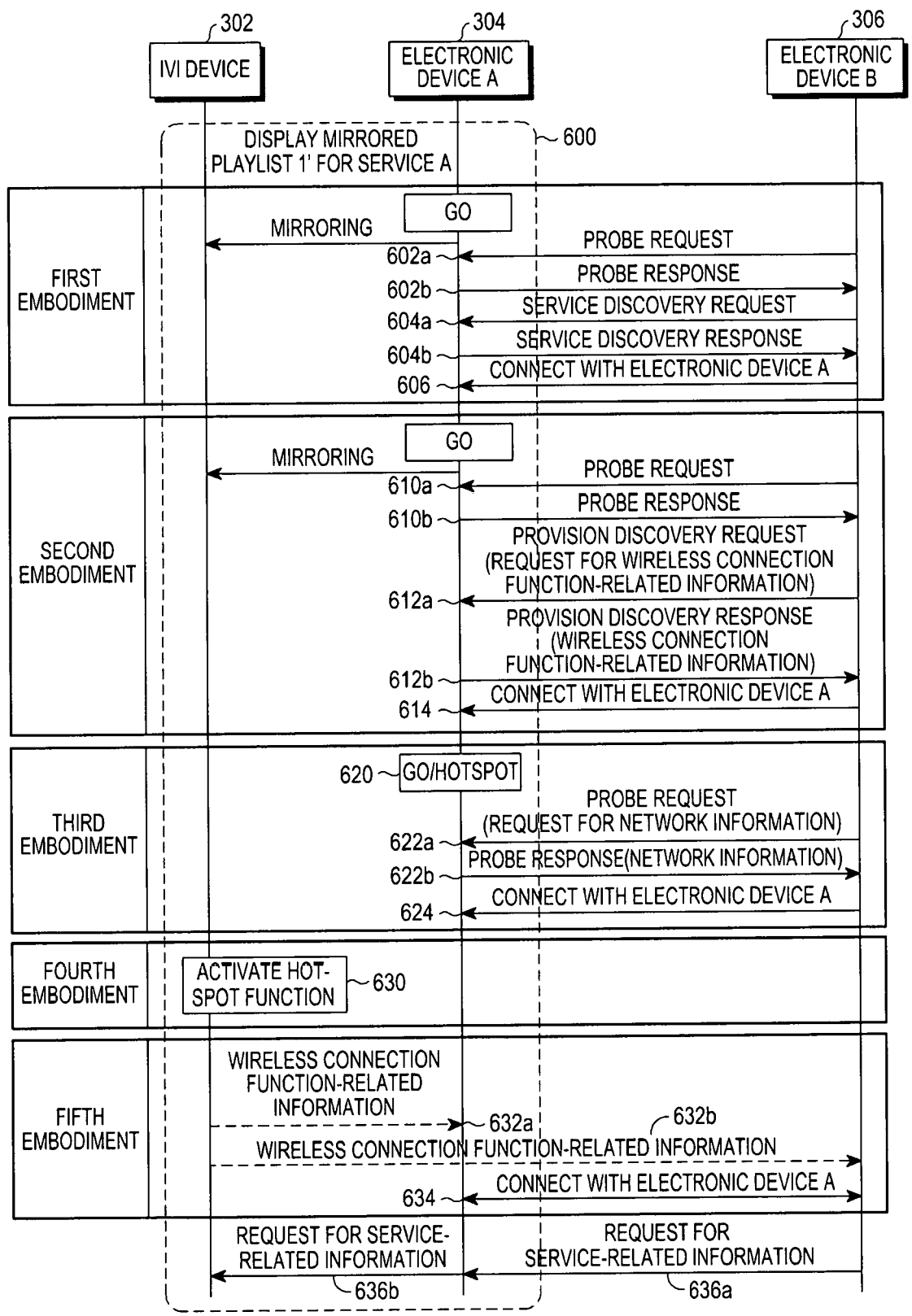
FIG. 6 shows an operation flow of embodiments in which an electronic device that is not connected with an IVI device searches for a nearby device and a service to control a service of the IVI device according to an embodiment of the present disclosure.

FIG. 6 shows an operation flow of embodiments in which an electronic device that is not connected with an IVI device searches for a nearby device and a service to control a service of the IVI device according to an embodiment of the present disclosure. The embodiment of FIG. 6 may vary with standards of wireless communication supported by an electronic device B. For example, a description will be made on the assumption that the electronic device B supports Wireless-Fidelity (Wi-Fi) peer to peer services (P2Ps). However, the electronic device B may perform a search for a nearby device and a service by using wireless connection that enables direct connection between supportable devices like in the fifth embodiment. The wireless connection may include, for example, Bluetooth, near field communication (NFC), infrared, hotspot, and so forth.

Referring to FIG. 6, reference numeral 600 indicates a state in which operations 312a through 312c of FIGS. 3A and 3B described above have been completed. That is, the IVI device 302 is connected with the electronic device A 304 and thus the electronic device A 304 is using a media streaming service corresponding to the mirrored playlist 1'. Thereafter, embodiments of operations of the electronic device B 306 in which the electronic device B 306 searches for and connects to the electronic device A 304 connected with the IVI device 302 to add an item that is not included in the playlist 1' are illustrated. In a first embodiment, in operation 602a, the electronic device B 306 sends a probe request for searching for a nearby device to be connected, on the basis of Wi-Fi P2Ps. Once receiving the probe request from the electronic device A 304 in operation 602b, the electronic device B 306 sends a service discovery request for requesting information about a service used by the electronic device A 304 to the electronic device A 304 in operation 604a. The electronic device A 304 then configures information about available services and sends a service discovery response including the configured information about the available services to the electronic device B 306 in operation 604b. Herein, the information about the available services may include a service name, a service item, a service state, etc., regarding a function available to or supportable for the electronic device A 304 due to subscription of the electronic device A 304. When identifying a service supporting an item to be added after checking the information about the available services, the electronic device B 306 connects to the electronic device A 304 in operation 606.

In a second embodiment, operations 610a and 610b are the same as operations 602a and 602b. In operation 612a, the electronic device B 306 sends a provision discovery request for asking whether direct connection with the service A server 308 is possible to the electronic device A 304. When the electronic device A 304 supports wireless connection that supports device-to-device direct connection, the electronic device A 304 transmits information related to a supportable wireless connection function to the electronic device B 306 through the provision discovery response in operation 612b. In more detail, the wireless connection function-related information may include identification information of the electronic device A 304, a password that is preset for connection to the function, session information, and so forth. In operation 614, the electronic device B 306 is connected to the electronic device A 304 by using the wireless connection function-related information.

In third and fourth embodiments, the electronic device A 304 is assumed to support a hot-spot function. Thus, temporary hot-spot is created using wireless Internet network connection of the electronic device A 304 or the IVI device 302, and the electronic device B 306 is connected to the electronic device A 304 on the basis of the created temporary hot-spot. More specifically, in the third embodiment, the electronic device A 304 is assumed to activate the hot-spot function. Then, in operation 622a, the electronic device B 306 sends a probe request including a request for network information for connection to the hot-spot created by the electronic device A 304, for example, a session identifier, etc. Once receiving a probe response including the network information from the electronic device A 304 in operation 622b, the electronic device B 306 is connected with the electronic device A 304 in operation 624.

In the fourth embodiment, it is assumed that the IVI device 302 is connectible with the wireless Internet and thus supports the hot-spot function. In this case, in operation 630, the IVI device 302 activates the hot-spot function. Also in this case, although not shown, the electronic device B 306 requests network information for connection to hot-spot created by the IVI device 302, for example, a session identifier, etc., obtains corresponding information from the IVI device 302, and connects to the IVI device 302.

In the fifth embodiment, when the electronic device A 304 and the electronic device B 306 support device-to-device wireless connection, the electronic device B 306 connects to the electronic device A 304 by using wireless connection that is compatible with the electronic device A 304 in operation 634. According to another embodiment, when the IVI device 302 provides wireless connection, the IVI device 302 broadcasts wireless connection function-related information in operations 632a and 634b, and the electronic device B 306 and the electronic device A 304 receive the broadcast wireless connection function-related information and are directly connected to the IVI device 302, respectively.

Thereafter, once the electronic device B 306 is wireless connected with the electronic device A 304 according to the above-described embodiments, the electronic device B 306 sends a request for service-related information about the playlist 1' mirrored onto the IVI device 302 to the IVI device 302 in operations 636a and 636b, and although not shown, receives the service-related information corresponding to the request from the IVI device 302. Herein, the service-related information may include a simple service discovery protocol (SSDP), a multicast domain name system (mDNS), etc., provided by the service A server 308. Herein, the service information may include a service name, a service A providing IP address, and so forth corresponding to the service A.

Figure 7:
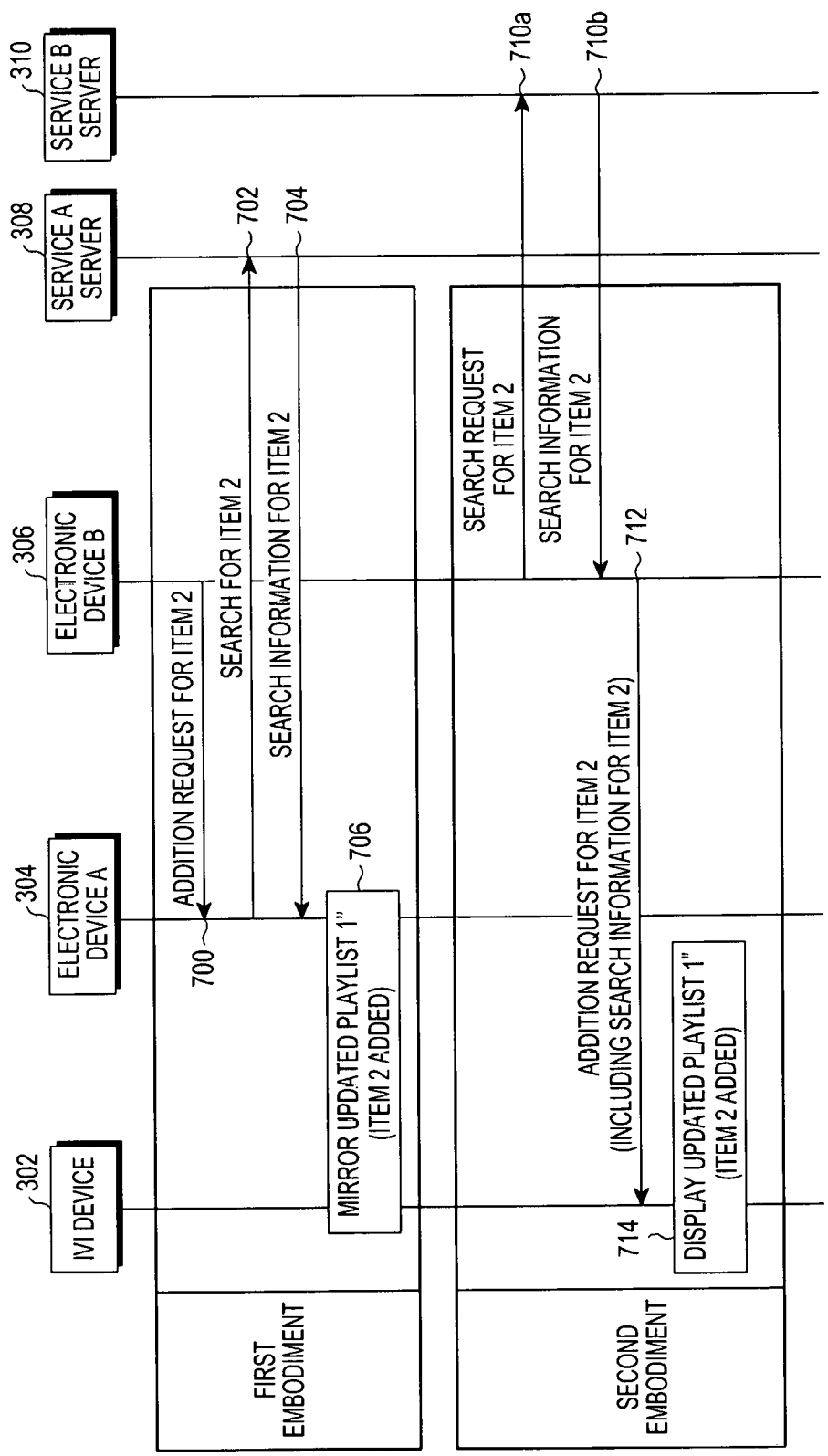
FIG. 7 shows an operation flow of embodiments in which an item corresponding to a request from another electronic device is added to a playlist of an IVI device according to an embodiment of the present disclosure.

FIG. 7 shows an operation flow of embodiments in which an item corresponding to a request from another electronic device is added to a playlist of an IVI device according to an embodiment of the present disclosure. For convenience, the electronic device B of FIG. 7 is connected with the service A through nearby device search and connection processes according to one of the embodiments of FIG. 6.

Referring to FIG. 7, for example, it may be assumed that one of items included in a playlist for the service B stored in the electronic device B 306 or a new item, that is, an item 2 is to be added to the playlist 1' mirrored onto the IVI device 302. In a first embodiment, in operation 700, the electronic device B 306 sends a request for adding the item 2 to the playlist 1' to the electronic device A 304. In this case, the addition request for adding the item 2 may include at least one of metadata of the item to be added. In operation 702, the electronic device A 304 connects to the service A server 308 through an application and requests a search for the item 2 on the basis of the metadata. In operation 704, when the service A server 308 provides the requested item, the service A server 308 transmits search information about the requested item to the electronic device A 304. Herein, the search information may include at least one of an identifier, a play time, sound quality information, and so forth of the requested item. In operation 706, the electronic device A 304 generates mirroring data corresponding to the displaying screen of the playlist 1" updated by addition of the item 2 to the playlist 1' mirrored onto the IVI device 302 and transmits the mirroring data to the IVI device 302.

In the second embodiment, it is assumed that a service B application of the electronic device B 306 is capable of 1:1 app interlocking with an application installed in the IVI device 302. In this case, in operation 710*a*, the electronic device B 306 accesses the service B server 310 and delivers a search request for the item 2 to be added to the service B server 310. When the service B server 310 provides the item to be added, the electronic device B 306 obtains metadata regarding the searched item 2 from the service B server 310 in operation 710*b* and sends an addition request for adding the item 2, which includes one of the metadata, to the IVI device 302 in operation 712. Then, in operation 714, the IVI device 302 displays the playlist 1″ updated by adding the item 2 through an application interlocking with the service B application.

Figure 8A:
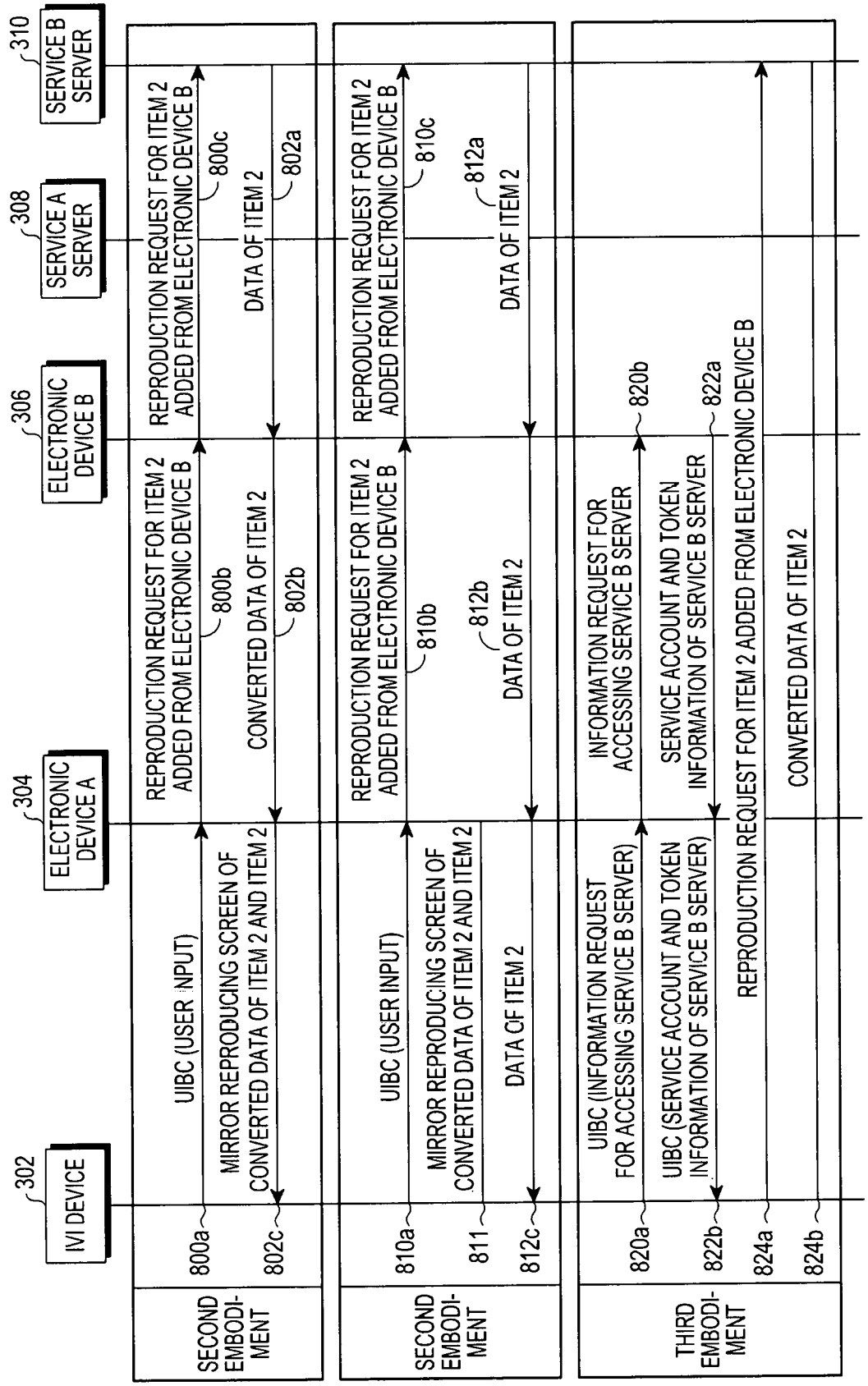
FIGS. 8A and 8B show operation flows of embodiments in which a media streaming service is used on the basis of a playlist including an item added by an electronic device that is not connected with an IVI device according to an embodiment of the present disclosure.
Figure 8B:
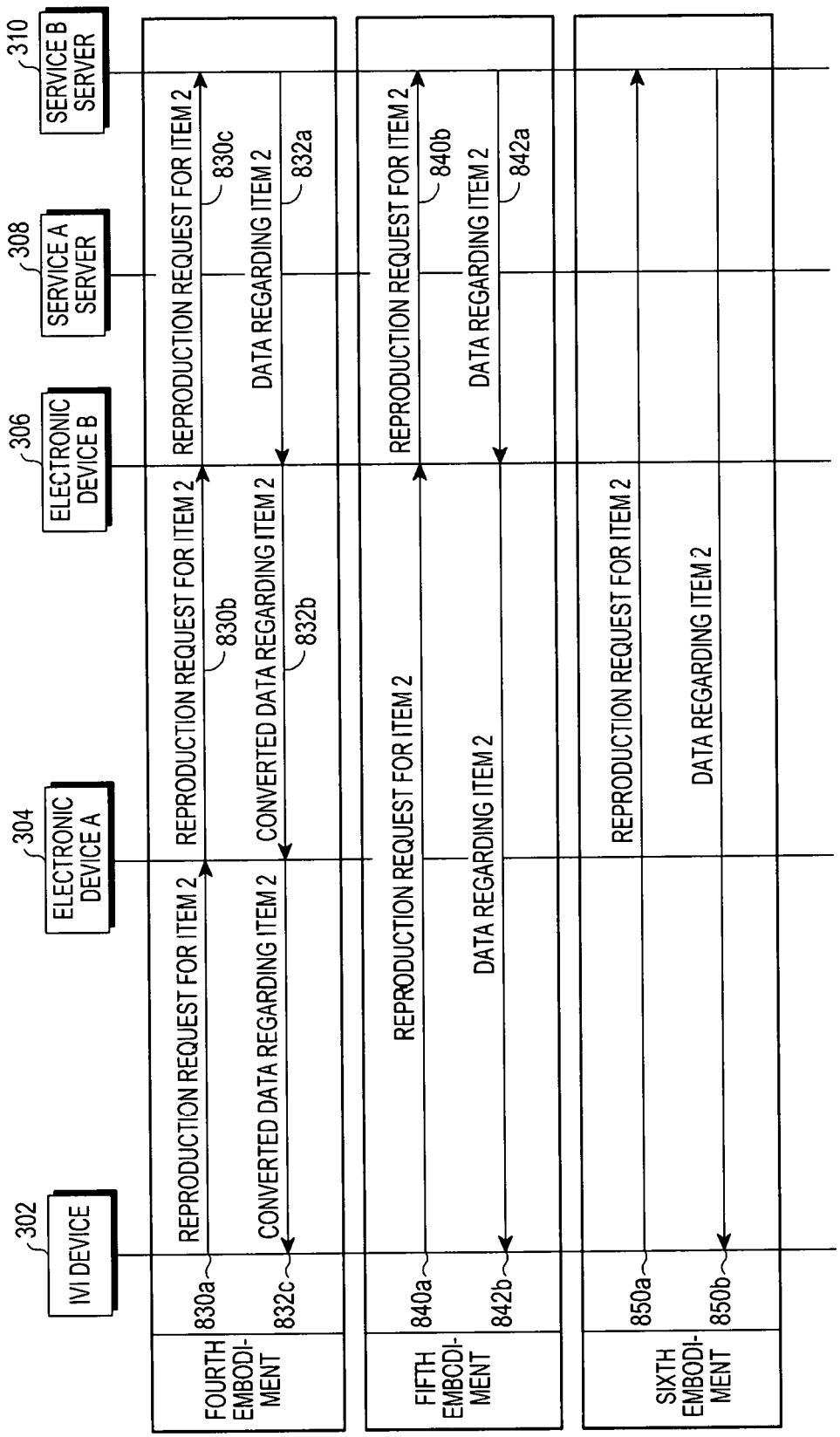

FIGS. 8A and 8B show operation flows of embodiments in which a media streaming service is used on the basis of a playlist including an item added by an electronic device that is not connected with an IVI device according to an embodiment of the present disclosure.

To use the item added by the electronic device that is not connected with the IVI device, the added item may be used through the service A to which the electronic device A 304 that currently maintains connection subscribes or through the service B to which the electronic device B 306 having added the item subscribes. When the added item is used through the service A server 308, the same scheme as described in the embodiments of FIG. 5 may be used based on a user input associated with the added item.

When the added item is used through the service B to which the electronic device B 306 subscribes, the electronic device B 306 is assumed to maintain connection with the electronic device A 304 according to one of the embodiments of FIG. 6. In a first embodiment where the added item is used through the service B, referring to FIG. 8A, the IVI device 302 delivers the user input sensed through the UIBC to the electronic device A 304 in operation 800*a*. Herein, the user input is assumed to be a request for reproducing the item 2 added to the playlist 1 mirrored by the electronic device A 304. Then, the electronic device A 304 sends the reproducing request to the electronic device B 306 in operation 800*b*, and the electronic device B 306 delivers the reproducing request to the service B server 310. The reproducing request may include one of the metadata of the item 2, for example, an identifier. In this case, the metadata of the item 2 is one of information included in the metadata of the item 2 obtained from the service B server 310 in response to the addition request from the electronic device B 308 in operation 316*a* of FIG. 3B.

The electronic device B 306 receives data of the item 2 streamed from the service B server 310 and converts the data into voice or an image in operation 802*a* and delivers the converted data to the electronic device A 306 in operation 802*b*. Then, the electronic device A 304 transmits the converted data, a reproducing screen of the converted data, and data corresponding to audio provided together with the reproducing screen on the electronic device A 304 to the IVI device 302 in operation 802*c*.

In the second embodiment where the added item is used through the service B to which the electronic device B 306 subscribes, the IVI device 302 is assumed to support coding of the data converted for output in the form of voice or an image. Coding by the IVI device 302 may be obtained during connection between the electronic device A 304 and the IVI device 302. More specifically, operations 810*a* through 812*b* are the same as operations 800*a* through 802*b*, and thus will not be described again. In operation 811, the electronic device A 320 according to the second embodiment transmits the reproducing screen of the item 2 to be mirrored onto the IVI device 302 and the data corresponding to the audio provided together with the reproducing screen on the electronic device A 304 to the IVI device 302, like in the second embodiment of FIG. 5. The electronic device B 306 obtains data of the item 2 from the service B server 310 in operation 812*a* and delivers the obtained data of the item 2 to the electronic device A 304 without converting the obtained data in operation 812*b*. Then, in operation 812*c*, the non-converted data of the item 2 is delivered to the IVI device 302 through a channel that is separate from the mirroring channel of the electronic device A 302. Thereafter, the IVI device 812*c* converts and reproduces the data of the item 2 by using direct coding.

In a third embodiment, the IVI device 302 senses a user input for directly requesting reproduction of the item 2 from the service B server 310. More specifically, it is assumed that the IVI device 302 senses a user input corresponding to an information request for accessing the service B server 310. In operation 820*a*, the IVI device 302 delivers the information request for accessing the service B server 310 to the electronic device A 304 through the UIBC. In operation 820*b*, the electronic device A 304 delivers the information request for accessing the service B server 310 to the electronic device B 306. Then, the electronic device B 306 transmits a service account, token information, and so forth of the service B server 310 to the electronic device A 304 in operation 822*a*, and the electronic device A 304 delivers the service account, the token information, and so forth of the service B server 310 to the IVI device 302 through the UIBC in operation 822*b*. When the IVI device 302 is directly connectible with the Internet, the user accesses the service B server 310 through the IVI device 302 without passing through the electronic device A 304 and inputs the reproduction request for reproducing the item 2 to send the request to the service B server 310 in operation 824*a*. In operation 824*b*, the IVI device 302 directly receives and reproduces the data of the item 2 streamed from the service B server 310. Depending on an embodiment, when the IVI device 302 is not directly connectible with the Internet, the IVI device 302 delivers the reproduction request for reproducing the item 2 to the service B server 310 through the electronic device A 304 by tethering to the electronic device A 304, and receives the data of the item 2 streamed from the service B server 310 through the electronic device A 304.

Fourth through sixth embodiments of FIG. 8B correspond to a case where the IVI device 302 uses 1:1 app interlocking.

In the fourth embodiment, it is assumed that the IVI device 302 supports an application interlocking with a service A application installed in the electronic device A 304. In operation 830*a*, the IVI device 302 delivers the reproduction request for reproducing the item 2 to the electronic device A 304 by using the application interlocking with the service A application. In this case, the reproduction request for reproducing the item 2 may include an identifier of the item 2 and information about the electronic device B 306 having requested the addition of the item 2. In operation 830*b*, the electronic device A 304 delivers the reproduction request for reproducing the item 2 to the electronic device B 306. In operation 830*c*, the electronic device B 306 accesses the service B server 310 through the installed service B application and delivers the reproduction request for reproducing the item 2 to the service B server 310. The electronic device B 306 receives data of the item 2 streamed from the service B server 310 and converts the data in operation 802*a* and delivers the converted data of the item 2 to the electronic device A 304 in operation 832*b*. Then, in operation 832*c*, the electronic device A 304 delivers the converted data of the item 2 to the IVI device 304.

In the fifth embodiment, it is assumed that the IVI device 302 supports an application interlocking with a service B application installed in the electronic device B 306. In this case, in operation 840*a*, the IVI device 302 delivers the reproduction request for reproducing the item 2 to the electronic device B 306 by using the application interlocking with the service B application installed in the electronic device B 306, without passing through the electronic device A 304. In operation 840*b*; the electronic device B 306 accesses the service B server 310 through the service B application and delivers the reproduction request for reproducing the item 2 to the service B server 310. In operations 842*a* and 842*b*, the electronic device B 306 receives the data regarding the item 2 streamed from the service B server 310 and delivers the data to an application of the IVI device 302.

In the sixth embodiment, when the IVI device 302 is connectible to the Internet and thus may install therein the service B application provided by the service B server 310, the IVI device 302 may directly deliver the reproduction request for reproducing the item 2 to the service B server 310 through the service B application in operation 850*a*. In operation 850*b*, in operation 850*b*, the data regarding the item 2 streamed from the service B server 310 is directly delivered to the IVI device 302. Then, in the fourth through sixth embodiments, the IVI device 302 converts and reproduces the data of the item 2 through an application that 1:1 app interlocks with the service B application.

Figure 9:
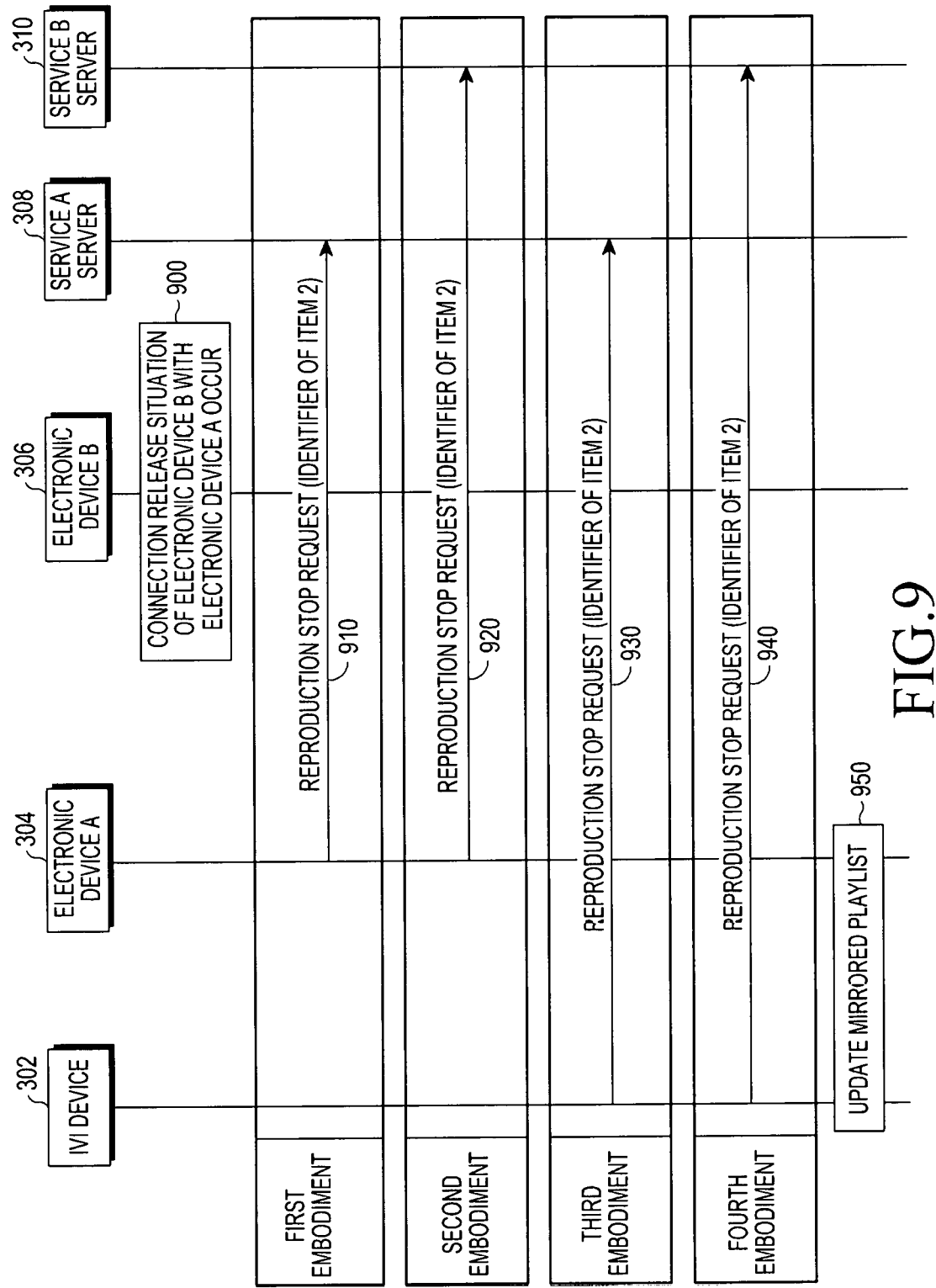
FIG. 9 shows an operation flow of embodiments in which an item added by an electronic device that is not connected with an IVI device is deleted from a mirrored playlist according to an embodiment of the present disclosure.

FIG. 9 shows an operation flow of embodiments in which an item added by an electronic device that is not connected with an IVI device is deleted from a mirrored playlist according to an embodiment of the present disclosure.

Referring to FIG. 9, in operation 900, it is assumed that a connection release situation between the electronic device A 304 and the electronic device B 306 occurs. For example, it may be assumed that the electronic device B 306 having added the item 2 to the playlist 1 mirrored onto the IVI device 302 leaves the vehicle 300 or connection of the electronic device B 306 to the electronic device A 304 is released. Depending on an embodiment, it may also be assumed that another user determines to stop playing the item 2. In a first embodiment, when a reproduction service of the item 2 is provided from the service A server 308, the electronic device A 304 sends a request for stopping reproduction of the item 2, which includes an identifier of the item 2, to the service A server 308 in operation 910. Then, the service A server 308 deletes the item 2 corresponding to the identifier of the item 2 from the playlist 1 in response to the reproduction stop request.

In a second embodiment, when the reproduction service of the item 2 is provided from the service B server 310, the electronic device A 304 sends the reproduction stop request including the identifier of the item 2 to the service B server 310 in operation 920. In this case, the electronic device A 304 accesses the service B server 310 by using information related to the service B server 310, which is received from the electronic device B 306. Then, the service B server 310 deletes the item 2 corresponding to the identifier of the item 2 from the playlist 1 in response to the reproduction stop request.

When the IVI device 302 is connectible to the Internet and thus directly accesses the service A server 308 or the service B server 310 to use the reproduction service of the item 2, or when the IVI device 302 is connectible to the Internet and has installed therein an application that 1:1 interlocks with the service A application or the service B application, like in third and fourth embodiments, the IVI device 302 sends the reproduction stop request including the identifier of the item 2 directly to the service A server 308 in operation 930 or sends the reproduction stop request including the identifier of the item 2 directly to the service B server 310 in operation 940. The service A server 308 or the service B server 310 having received the reproduction request deletes the item 2 corresponding to the identifier of the item 2 from the playlist 1.

Thereafter, in operation 950, the electronic device A 304 updates the playlist 1' by deleting the item 2 from the playlist 1' mirrored onto the IVI device 302 like in the scheme described in the embodiments of FIG. 4, and transmits data corresponding to the updated playlist 1' to the IVI device 302.

Although it has been described in the embodiment of FIG. 9 that there is one item to be deleted, there may be a plurality of items to be deleted from the mirrored playlist. According to an embodiment, when at least one item is added to the mirrored playlist through an electronic device of another user, which is not connected with the IVI device, the IVI device maps the electronic device of the user or identification information of the user to each of the added items and displays them. Thus, when an electronic device connected with the IVI device determines to delete the added items or the user having added the items gets off the vehicle, the items may be deleted from the mirrored playlist on the basis of identification information of the user.

Figure 10A:
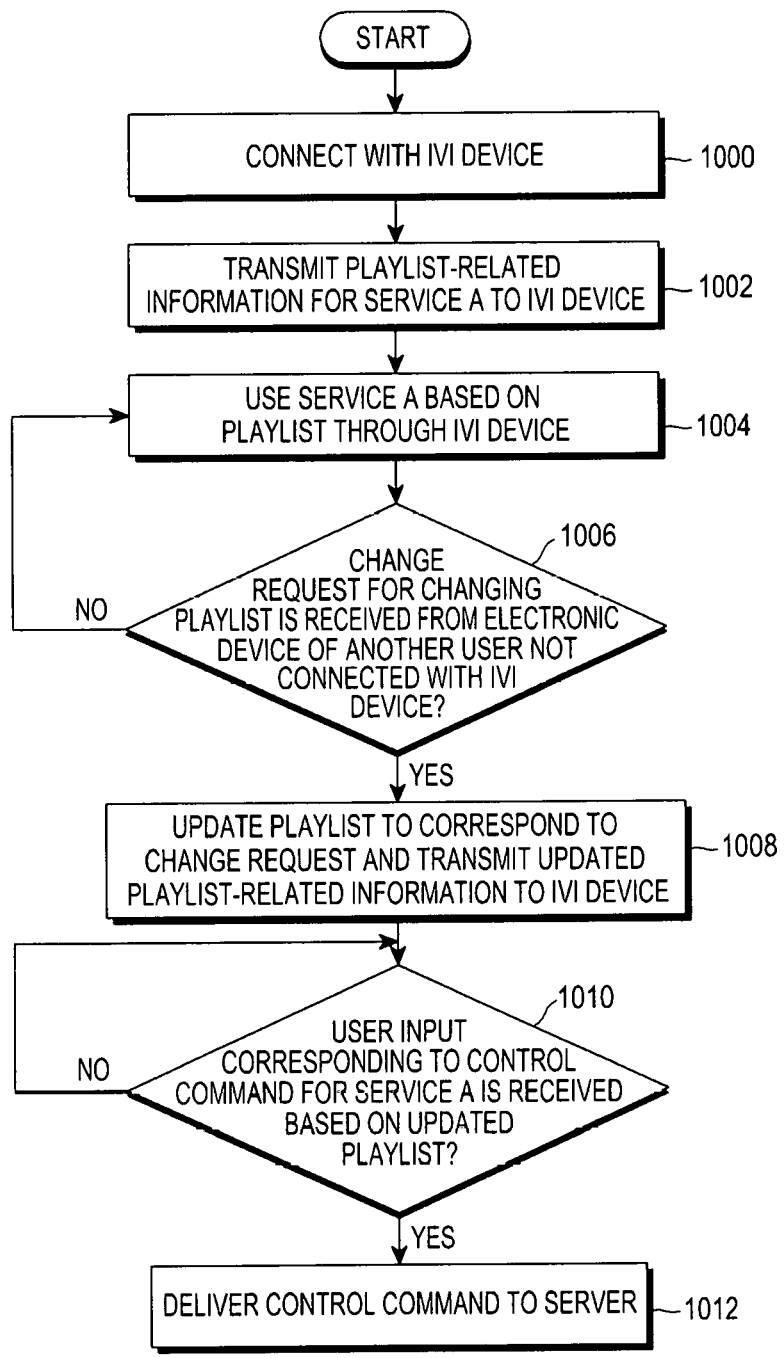
FIG. 10A is an example of a flowchart illustrating operations of an electronic device connected with an IVI device according to an embodiment of the present disclosure.

FIG. 10A is an example of a flowchart illustrating operations of an electronic device connected with an IVI device according to an embodiment of the present disclosure. It is assumed that the electronic device in FIG. 10 corresponds to the electronic device A 304 of FIG. 3A and performs the operations of the electronic device A 304 in the above-described embodiments for convenience.

Referring to FIG. 10A, in operation 1000, the electronic device A is connected with the IVI device and transmits a playlist of a service interlocked through the IVI device, for example, a media streaming service, to the IVI device. In this case, connection with the IVI device is performed using mirroring or 1:1 app interlocking.

In operation 1002, the electronic device A executes the service A application installed after downloaded from the service A server that provides the media streaming service, generates and configures playlist-related information by retrieving the playlist of the service A or selecting items to be reproduced from among items provided by the service A server, and transmits the playlist-related information to the IVI device. The playlist-related information is a screen on which the playlist is displayed through the service A application when mirroring is used and is indication information of the playlist when 1:1 app interlocking is used. Herein, the displaying of the playlist through the IVI device is the same as the description of FIG. 4, and thus will not be described in detail.

Thus, in operation 1004, the electronic device A uses the service A on the basis of the playlist through the IVI device. In operation 1006, the electronic device A determines whether a change request for changing the playlist is received from an electronic device of another user (e.g., the electronic device B 308 of FIG. 3A), which is not connected with the IVI device. When determining that the change request is not received, the electronic device A returns to operation 1004 to continue using the service A based on the playlist.

When determining that the change request is received, the electronic device A updates the playlist to correspond to the change request, transmits the updated playlist-related information to the IVI device, and uses the service A on the basis of the updated playlist in operation 1008. To receive the change request, the electronic device A and the electronic device B have to be connected, and to use the service A on the basis of the updated playlist, operations of obtaining metadata corresponding to the change request and configuring the updated playlist are performed. A description of the operations overlaps the description of FIGS. 6 and 7, and thus will not be provided.

In operation 1010, the electronic device A determines whether a user input corresponding to a control command for the service A is received from the IVI device on the basis of the updated playlist. When determining that the user input corresponding to the control command for the service A is not received, the electronic device A continues using the service A on the basis of the updated playlist.

When determining that the user input corresponding to the control command for the service A is received, the electronic device A delivers the control command to the service A server or to the service B server through the electronic device B in operation 1012. Herein, a description of the service using operation in operations 1004 through 1012 overlaps the description of the embodiments of FIGS. 5 and 8, and thus will not be provided. The control command includes deletion of the added item from the updated playlist, and in this case, a description thereof overlaps the embodiments of FIG. 9 and thus will not be provided.

Figure 10B:
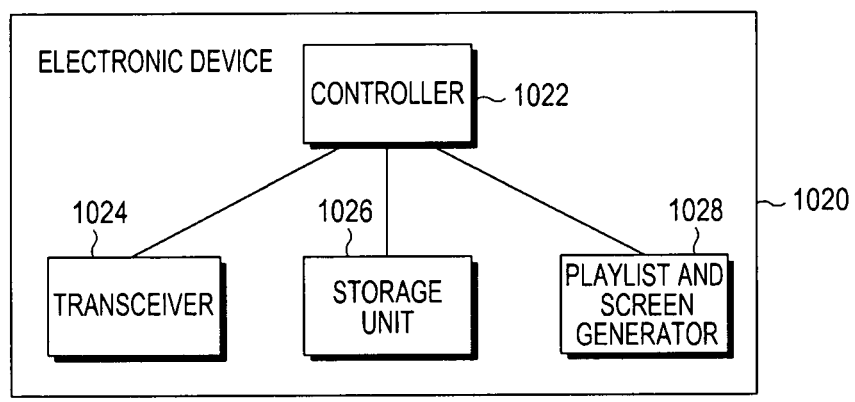
FIG. 10B is an example of a block diagram of an electronic device connected with an IVI device according to an embodiment of the present disclosure.

FIG. 10B is an example of a block diagram of an electronic device connected with an IVI device according to an embodiment of the present disclosure.

Referring to FIG. 10B, an electronic device 1020 may include a controller 1022, a transceiver 1024, a storage unit 1026, and a playlist and screen generator 1028. Herein, the structure of the electronic device 1020 is illustrated as an example, in which the structure may be divided to include detailed components or some components thereof may be integrated depending on an embodiment or an operator's intention.

The controller 1022 controls the transceiver 1024, the storage unit 1026, and the playlist and screen generator 1028 to perform the overall operations of the electronic device A 304 described in the embodiments described above with reference to FIGS. 3A through 9. The transceiver 1024, the storage unit 1026, and the playlist and screen generator 1028 also operate according to an instruction of the controller 1022. The storage unit 1026 separately stores a playlist generated by the electronic device A for personal use and a playlist generated for use in the IVI device, as described in the embodiments of FIG. 4. For example, the storage unit 1026 may store the playlists in separate storage spaces such as the frame buffer 1 and the frame buffer 2 or further store updated playlists.

The electronic device 1020 of FIG. 10B may operate as the electronic device B 306 described in the embodiments described with reference to FIGS. 3A through 9. In this case, the controller 1022 controls the transceiver 1024, the storage unit 1026, and the playlist and screen generator 1028 to perform the overall operations of the electronic device B 306 described in the embodiments described above with reference to FIGS. 3A through 1022. The transceiver 1024, the storage unit 1026, and the playlist and screen generator 1028 also operate according to an instruction of the controller 1022.

Figure 11:
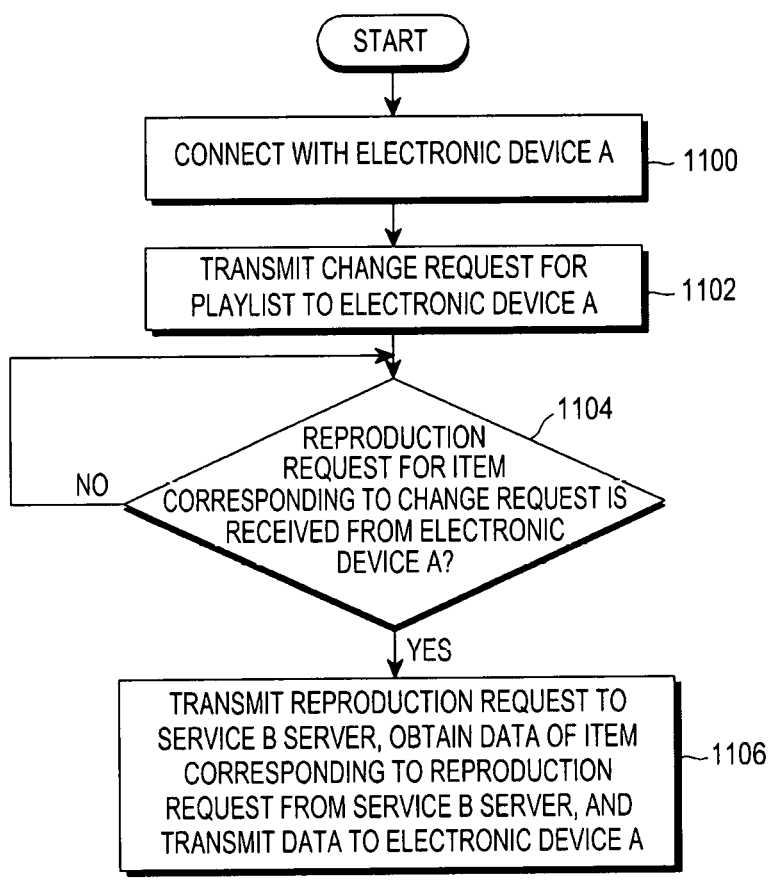
FIG. 11 is an example of a flowchart illustrating operations of an electronic device that is not connected with an IVI device according to an embodiment of the present disclosure.

FIG. 11 is an example of a flowchart illustrating operations of an electronic device that is not connected with an IVI device according to an embodiment of the present disclosure. It is assumed that the electronic device in FIG. 11 corresponds to the electronic device B 306 of FIG. 3A and performs the operations of the electronic device B 306 in the above-described embodiments for convenience.

Referring to FIG. 11, it is assumed that the service A provided from the service A server to which the electronic device A subscribes is used through the IVI device. In this case, in operation 1100, the electronic device B connects with the electronic device A to send a change request for changing the playlist provided in the IV device. The connection is performed in the same manner as in the embodiments of FIG. 6, and thus will not be described repeatedly.

Once connected with the electronic device A, the electronic device B sends the change request for the playlist to the electronic device A in operation 1102. The sending of the change request is performed in the same manner as in the embodiments of FIG. 7, and thus will not be described repeatedly.

In operation 1104, the electronic device B determines whether a reproduction request for an item corresponding to the change request is received from the electronic device A. When determining that the reproduction request is received, the electronic device B sends the reproduction request to the service B server, obtains data of the item corresponding to the reproduction request from the service B server, and sends the obtained data to the electronic device A in operation 1106. Operations 1104 and 1106 are performed in the same manner as in the embodiments of FIG. 8, and thus will not be described repeatedly.

When determining that the reproduction request is not received, the electronic device B waits for reception of the reproduction request in operation 1104 while using the service provided in the IVI device on the basis of the playlist. The service use operation is performed in the same manner as in the embodiments of FIG. 5 or 8, and thus will not be described repeatedly.

Figure 12A:
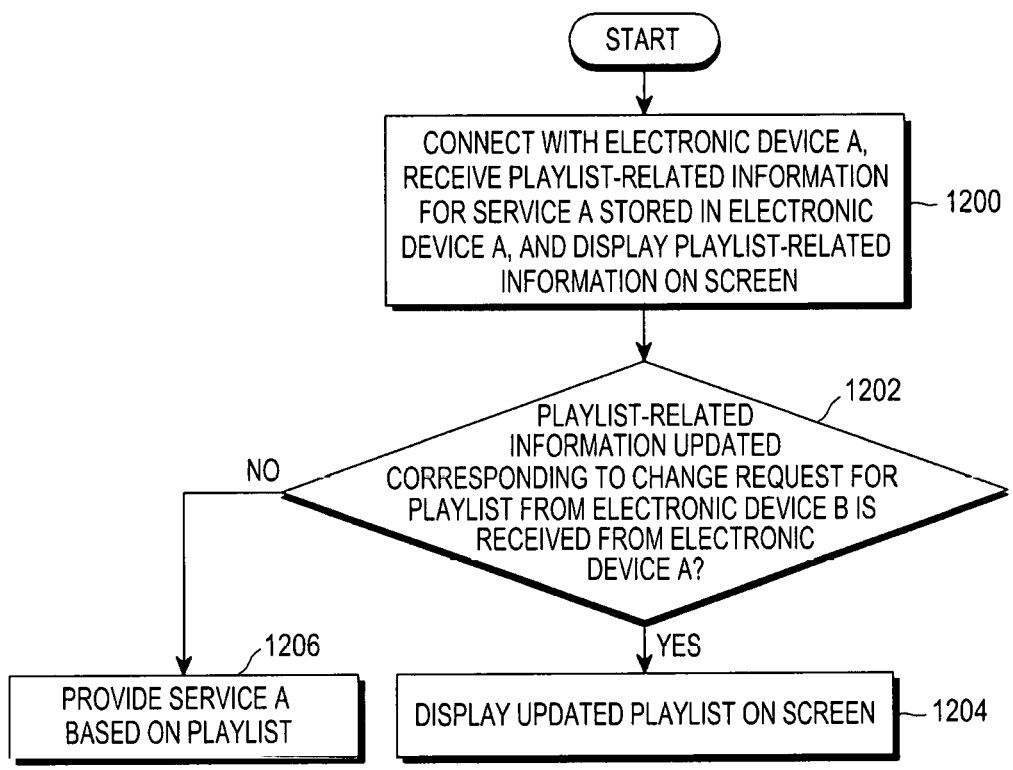
FIG. 12A is an example of a flowchart illustrating operations of an IVI device that provides a service interlocking with an electronic device according to an embodiment of the present disclosure.

FIG. 12A is an example of a flowchart illustrating operations of an IVI device that provides a service interlocking with an electronic device according to an embodiment of the present disclosure. It is assumed that the IVI device in FIG. 12A corresponds to the IVI device 302 of FIG. 3A and performs the operations of the IVI device 302 in the above-described embodiments for convenience.

Referring to FIG. 12A, in operation 1200, the IVI device connects to the electronic device A, receives playlist-related information for the service A stored in the electronic device A from the electronic device A, and displays the playlist on a screen. In this case, connection with the electronic device A is performed using mirroring or 1:1 app interlocking. The displaying of the playlist is performed in the same manner as in the embodiments of FIG. 4, and thus will not be described repeatedly.

In operation 1202, the IVI device determines whether the playlist-related information updated to correspond to the change request for the playlist from the electronic device B is received from the electronic device A. When determining that the updated playlist-related information is received, the IVI device displays the updated playlist on the screen in operation 1204. Herein, the displaying of the updated playlist is performed in the same manner as in the embodiments of FIG. 8, and thus will not be described repeatedly.

When determining that the updated playlist-related information is not received, the IVI device provides the service A on the basis of the playlist in operation 1206.

Figure 12B:
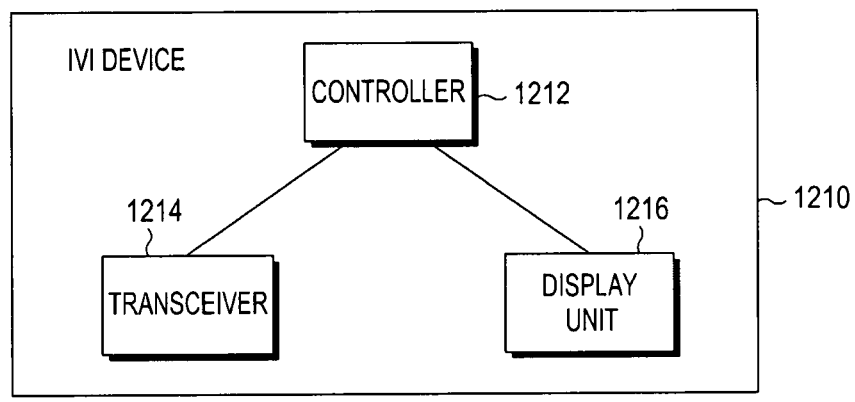
FIG. 12B is an example of a block diagram of an IVI device according to an embodiment of the present disclosure.

FIG. 12B is an example of a block diagram of an IVI device according to an embodiment of the present disclosure.

Referring to FIG. 12B, an IVI device 1210 may include a controller 1212, a transceiver 1214, and a display unit 1216. Herein, the structure of the IVI device 1210 is illustrated as an example, in which the structure may be divided to include detailed components or some components thereof may be integrated depending on an embodiment or an operator's intention.

The controller 1012 controls the transceiver 1214 and the display unit 1216 to perform the overall operations of the IVI device 302 described in the embodiments described above with reference to FIGS. 3A through 9. The transceiver 1214 and the display unit 1216 also operate according to an instruction of the controller 1212.

According to the embodiments of the present disclosure, the service provided in the IVI device by interlocking with one electronic device may be controlled through at least one electronic device that is not connected with the IVI device.

Particular aspects of the present disclosure may be implemented with a computer-readable code on a computer-readable recording medium. The computer readable recording medium may be any type of data storage device that may store data readable by a computer system. Examples of record-mediums readable by the computer may include a read-only memory (ROM), a random-access memory (RAM), compact disk ROM (CD-ROM), magnetic tapes, floppy disks, optical data storage devices, carrier waves (such as data transmission through the Internet). The computer readable recording medium may be distributed through computer systems connected over a network, and thus the computer readable code is stored and executed in a decentralized manner. Further, functional programs, codes and code segments for achieving the present disclosure may be easily interpreted by programmers skilled in the art which the present disclosure pertains to.

The apparatus and method according to an embodiment of the present disclosure may be implemented by hardware, software, or a combination of hardware and software. Such software may be stored, whether or not erasable or re-recordable, in a volatile or non-volatile storage such as a read-only memory (ROM), a memory such as a random access memory (RAM), a memory chip, a device, or an integrated circuit; and an optically or magnetically recordable and machine (e.g., computer)-readable storage medium such as a compact disc (CD), a digital versatile disk (DVD), a magnetic disk, or a magnetic tape. It can be seen that the method according to the present disclosure may be implemented by a computer or a portable terminal which includes a controller and a memory, and the memory is an example of a machine-readable storage medium which is suitable for storing a program or programs including instructions for implementing the embodiment of the present disclosure.

Therefore, the present disclosure includes a program including codes for implementing an apparatus or method claimed in an arbitrary claim and a machine (computer)-readable storage medium for storing such a program. The program may be electronically transferred through an arbitrary medium such as a communication signal delivered through a wired or wireless connection, and the present disclosure properly includes equivalents thereof.

The apparatus according to an embodiment of the present disclosure may receive and store the program from a program providing device connected in a wired or wireless manner. The program providing device may include a memory for storing a program including instructions for instructing the apparatus to execute a preset method, information necessary for the method, a communication unit for performing wired or wireless communication with the apparatus, and a controller for transmitting a corresponding program to the apparatus at the request of the apparatus or automatically.

While embodiments of the present disclosure have been described, various changes may be made without departing the scope of the present disclosure. Therefore, the scope of the present disclosure should be defined by the appended claims and equivalents thereof, rather than by the described embodiments.

The invention claimed is:

1. A method for controlling a service interlocking with a first device in an in-vehicle infotainment (IVI) system, the method being performed by the first device and comprising:
setting up connection with an IVI device and transmitting, to the IVI device, first mirroring data corresponding to a displaying screen of a first playlist including at least one first items for a multimedia service used in the first device;
setting up connection with a second device and receiving, from the second device, an addition request for adding at least one second item to the first playlist;
obtaining metadata of the at least one second item from the addition request;
transmitting a search request for the at least one second item to a first server that provides the multimedia service based on the metadata;
identifying whether to receive of a search result for the at least one second item from the first server in response to transmission of the search request;
transmitting the search request to the second device based on a failure to receive of the search result from the first server;
receiving, from the second device, the search result obtained from a second server to which the second device subscribes;
generating a second playlist by adding the at least one second item to the first playlist based on the search result; and
transmitting, to the IVI device, second mirroring data corresponding to a displaying screen of the second playlist.

2. The method of claim 1, further comprising:
receiving the search result from the first server in response to the transmission of the search request;
generating the second playlist by adding the at least one second item to the first playlist based on the search result; and
transmitting the second mirroring data to the IVI device.

3. The method of claim 1, further comprising:
storing the first playlist in a first buffer, and storing the second playlist in a second buffer.

4. The method of claim 1, further comprising:
receiving a reproduction request for the at least one second item from the second device;
transmitting the reproduction request to the first server;
receiving data of the at least one second item from the first server;
encoding the data of the at least one second item; and
transmitting the encoded data to the IVI device.

5. The method of claim 1, further comprising:
receiving a request for information related to the first server from the IVI device;
transmitting the information related to the first server to the IVI device; and providing tethering for access to the first server to the IVI device when the IVI device does not support Internet connection.

6. The method of claim 1, further comprising:
receiving a reproduction request for the at least one second item from the IVI device;
transmitting the reproduction request to the second device;
receiving, from the second device, data of the at least one second item provided from the second server;
encoding the data of the at least one second item; and
transmitting the encoded data to the IVI device.

7. The method of claim 1, further comprising:
receiving an information request for information related to the second server from the IVI device;
delivering the information request to the second device in response to reception of the information request;
receiving the information related to the second server from the second device and delivering the received information to the IVI device; and
providing tethering for access to the second server to the IVI device when the IVI device does not support Internet connection.

8. The method of claim 1, further comprising:
mapping a flag indicating temporary use to the at least one second item and storing the flag.

9. The method of claim 1, further comprising:
identifying that the connection with the second device is released; and
transmitting, to the second server, a deletion request for deleting the at least one second item from the second playlist by using the information related to the second server.

10. A first device for controlling a service interlocking with the first device in an in-vehicle infotainment (IVI) system, the first device comprising:
a transceiver; and
at least one processor configured to:
set up connection with an IVI device, and control the transceiver to transmit, to the IVI device, first mirroring data corresponding to a displaying screen of a first playlist including at least one first item for a multimedia service used in the first device,
set up connection with a second device, and control the transceiver to receive, from the second device, an addition request for adding at least one second item to the first playlist,
obtain metadata of the at least one second item from the addition request,
control the transceiver to transmit a search request for the at least one second item to a first server that provides the multimedia service based on the metadata,
identify whether to receive of a search result for the at least one second item from the first server in response to transmission of the search request,
control the transceiver to transmit the search request to the second device based on a failure to receive of the search result from the first server,
control the transceiver to receive, from the second device, the search result obtained from a second server to which the second device subscribes,
generate a second playlist by adding the at least one second item to the first playlist based on the search result, and
control the transceiver to transmit, to the IVI device, second mirroring data corresponding to a displaying screen of the second playlist.

11. The first device of claim 10,
wherein the at least one processor is further configured to:
control the transceiver to receive the search result from the first server in response to the transmission of the search request,
generate the second playlist by adding the at least one second item to the first playlist based on the search result, and
control the transceiver to transmit the second mirroring data to the IVI device.

12. The first device of claim 10, wherein the at least one processor is further configured to store the first playlist in a first buffer, and storing the second play list in a second buffer.

13. The first device of claim 10, wherein the at least one processor is further configured to:
control the transceiver to receive a reproduction request for the at least one second item from the second device,
control the transceiver to transmit the reproduction request to the first server,
control the transceiver to receive data of the at least one second item from the first server,
encode the data of the at least one second item, and
control the transceiver to transmit the encoded data to the IVI device.

14. The first device of claim 10, wherein the at least one processor is further configured to:
control the transceiver to receive a request for information related to the first server,
control the transceiver to transmit the information related to the first server to the IVI device, and
provide tethering for access to the first server to the IVI device when the IVI device does not support Internet connection.

15. The first device of claim 10, wherein the at least one processor is further configured to:
control the transceiver to receive a reproduction request for the at least one second item from the IVI device,
control the transceiver to transmit the reproduction request to the second device,
control the transceiver to receive, from the second device, data of the at least one second item provided from the second server,
encoding the data of the at least one second item, and
control the transceiver to transmit the encoded data to the IVI device.

16. The first device of claim 10, wherein the at least one processor is further configured to control the transceiver to:
receive an information request for information related to the second server from the IVI device,
deliver the information request to the second device in response to reception of the information request,
receive the information related to the second server from the second device and delivering the received information to the IVI device, and
provide tethering for access to the second server to the IVI device when the IVI device does not support Internet connection.

17. The first device of claim 16, wherein the at least one processor is configured to:
identify that the connection with the second device is released, and
control the transceiver to transmit, to the second server, a deletion request for deleting the at least one second item from the second playlist by using the information related to the second server.

18. The first device of claim 10, wherein the at least one processor is further configured to map a flag indicating temporary use to the at least one second item and storing the flag.

\* \* \* \* \*